United States Patent [19]

Riga et al.

[11] Patent Number: 5,129,972
[45] Date of Patent: Jul. 14, 1992

[54] EMULSIFIERS AND EXPLOSIVE EMULSIONS CONTAINING SAME

[75] Inventors: Alan T. Riga, Cleveland; John W. Forsberg, Mentor, both of Ohio

[73] Assignee: The Lubrizol Corporation, Wickliffe, Ohio

[21] Appl. No.: 733,068

[22] Filed: Jul. 17, 1991

Related U.S. Application Data

[60] Continuation of Ser. No. 509,399, Apr. 13, 1990, abandoned, which is a continuation of Ser. No. 380,054, Jul. 14, 1989, Pat. No. 4,919,178, which is a continuation-in-part of Ser. No. 367,185, Jun. 16, 1989, Pat. No. 4,956,028, which is a continuation of Ser. No. 931,377, Nov. 14, 1986, Pat. No. 4,840,687, which is a continuation-in-part of Ser. No. 137,303, Dec. 23, 1987, Pat. No. 4,863,534, said Ser. No. 380,054, is a continuation-in-part of Ser. No. 265,877, Nov. 1, 1988, Pat. No. 5,047,175, which is a division of Ser. No. 137,301, Dec. 23, 1987, Pat. No. 4,828,633.

[51] Int. Cl.$^5$ ............................................ C06B 45/00
[52] U.S. Cl. ..................................... 149/2; 149/21; 149/40; 149/41; 149/42; 149/43; 149/44; 149/46; 149/60; 149/61; 149/76; 149/83; 252/309; 252/356
[58] Field of Search ................. 149/2, 21, 40, 41, 42, 149/43, 44, 46, 60, 61, 76, 83; 252/309, 356

[56] References Cited

U.S. PATENT DOCUMENTS

| | | | |
|---|---|---|---|
| 2,345,199 | 3/1944 | Hodson | 252/49 |
| 3,161,551 | 12/1964 | Egly et al. | 149/46 |
| 3,212,945 | 10/1965 | Berthmann et al. | 149/51 |
| 3,216,936 | 11/1965 | Le Suer | 252/32.7 |
| 3,219,666 | 11/1965 | Norman et al. | 260/268 |
| 3,269,946 | 8/1966 | Wiese | 252/32.5 |
| 3,281,356 | 10/1966 | Coleman | 252/32.7 |
| 3,311,558 | 3/1967 | Prizer et al. | 252/47.5 |
| 3,311,561 | 3/1967 | Anderson et al. | 252/75 |
| 3,364,001 | 1/1968 | Grummond et al. | 44/71 |
| 3,378,494 | 4/1968 | Berger et al. | 252/77 |
| 3,390,082 | 6/1968 | Le Suer et al. | 252/32.7 |
| 3,397,097 | 8/1968 | Atadan et al. | 149/46 |
| 3,442,727 | 5/1969 | Thornton | 149/46 |
| 3,447,978 | 6/1969 | Bluhm | 149/2 |
| 3,447,979 | 6/1969 | Bluhm et al. | 149/19 |
| 3,453,155 | 7/1969 | Sheeram et al. | 149/5 |
| 3,459,608 | 8/1969 | Ludolphy et al. | 149/56 |
| 3,541,012 | 11/1970 | Stuebe | 252/51.5 |
| 3,576,743 | 4/1971 | Widmer et al. | 252/51.5 |
| 3,617,406 | 11/1971 | Young | 149/41 |
| 3,629,119 | 12/1971 | Weaver | 252/77 |
| 3,632,511 | 1/1972 | Liao | 252/51.5 A |
| 3,639,242 | 2/1972 | Le Suer | 252/56 R |
| 3,658,707 | 4/1972 | Delafield et al. | 252/51.5 A |
| 3,674,578 | 7/1972 | Cattermole et al. | 149/2 |
| 3,687,644 | 8/1972 | Delafield et al. | 44/56 |
| 3,708,522 | 1/1973 | Le Suer | 260/485 G |
| 3,715,247 | 2/1973 | Wade | 149/21 |
| 3,765,961 | 10/1973 | Wade | 149/2 |
| 3,770,522 | 11/1973 | Tomic | 149/2 |
| 3,794,534 | 2/1974 | Chandler | 149/2 |
| 3,836,470 | 9/1974 | Miller | 252/51.5 A |
| 3,836,471 | 9/1974 | Miller | 252/51.5 A |
| 3,838,052 | 9/1974 | Miller | 252/56 R |
| 3,868,330 | 2/1975 | Meinhardt et al. | 252/33.6 |
| 3,868,813 | 9/1975 | Gergel | 260/239.3 R |
| 3,933,659 | 1/1976 | Lyle et al. | 252/32.7 E |
| 3,948,800 | 4/1976 | Meinhardt | 252/356 |
| 3,957,854 | 5/1976 | Miller | 260/482 R |
| 4,008,108 | 2/1977 | Chrimp | 149/2 |
| 4,010,105 | 3/1977 | Holgado | 252/77 |
| 4,048,080 | 9/1977 | Su et al. | 252/51.54 |
| 4,053,426 | 10/1977 | Davis et al. | 252/34 |
| 4,098,585 | 7/1978 | Vartanian et al. | 44/63 |
| 4,110,134 | 8/1978 | Wade | 149/2 |
| 4,111,727 | 9/1978 | Clay | 149/2 |
| 4,138,281 | 2/1979 | Olney et al. | 149/2 |
| 4,140,640 | 2/1979 | Scherubel | 252/8.55 C |
| 4,141,767 | 2/1979 | Sudweeks et al. | 149/2 |
| 4,149,916 | 4/1979 | Wade | 149/56 |
| 4,149,917 | 4/1979 | Wade | 149/56 |
| 4,181,546 | 1/1980 | Clay | 149/21 |
| 4,185,485 | 1/1980 | Schick et al. | 72/42 |
| 4,203,855 | 5/1980 | Steckel | 252/42.7 |
| 4,216,040 | 8/1980 | Sudweeks et al. | 149/21 |

(List continued on next page.)

FOREIGN PATENT DOCUMENTS

| | | |
|---|---|---|
| 0156572 | 10/1985 | European Pat. Off. . |
| 87/8540 | 10/1988 | South Africa . |
| 984409 | 2/1965 | United Kingdom . |
| 1009197 | 11/1965 | United Kingdom . |
| 1020293 | 2/1966 | United Kingdom . |
| 1098936 | 1/1968 | United Kingdom . |
| 1162436 | 8/1969 | United Kingdom . |
| 1206059 | 9/1970 | United Kingdom . |
| 1214245 | 12/1970 | United Kingdom . |
| 1306546 | 2/1973 | United Kingdom . |
| 1335097 | 10/1973 | United Kingdom . |
| 1423876 | 2/1976 | United Kingdom . |
| 1532836 | 11/1978 | United Kingdom . |
| 1538092 | 1/1979 | United Kingdom . |
| 1557917 | 12/1979 | United Kingdom . |
| 2042495A | 9/1980 | United Kingdom . |
| 2058740A | 4/1981 | United Kingdom . |

Primary Examiner—Stephen J. Lechert, Jr.
Attorney, Agent, or Firm—John H. Engelmann; Frederick D. Hunter; Forrest L. Collins

[57] ABSTRACT

Emulsifiers are disclosed which comprise the reaction product of component (I) with component (II). Component (I) comprises the reaction product of certain carboxylic acids or anhydrides, or ester or amide derivatives thereof, with ammonia, at least one amine, at least one alkali and/or at least one alkaline-earth metal. Component (II) comprises certain phosphorus-containing acids; or metal salts of said phosphorus-containing acids, the metal being selected from the group consisting of magnesium, calcium, strontium, chromium, manganese, iron, molybdenum, cobalt, nickel, copper, silver, zinc, cadmium, aluminum, tin, lead, and mixtures of two or more thereof. These emulsifiers are useful in water-in-oil explosive emulsions.

106 Claims, No Drawings

U.S. PATENT DOCUMENTS

| | | | |
|---|---|---|---|
| 4,218,272 | 8/1980 | Brockington | 149/21 |
| 4,225,447 | 9/1980 | Law et al. | 252/34.7 |
| 4,230,588 | 10/1980 | Bonazza et al. | 252/51.5 A |
| 4,231,821 | 11/1980 | Sudweeks et al. | 149/21 |
| 4,233,165 | 11/1980 | Salathiel et al. | 252/8.55 R |
| 4,234,435 | 11/1980 | Meinhardt et al. | 252/51.5 A |
| 4,248,644 | 2/1981 | Healy | 149/21 |
| 4,253,974 | 3/1981 | Valcho et al. | 252/8.55 D |
| 4,253,975 | 3/1981 | Law et al. | 252/32.7 E |
| 4,287,010 | 9/1981 | Owen | 149/2 |
| 4,294,633 | 10/1981 | Clay | 149/2 |
| 4,310,364 | 1/1982 | Ekman et al. | 149/2 |
| 4,315,784 | 2/1982 | Hattori et al. | 149/2 |
| 4,315,787 | 2/1982 | Hattori et al. | 149/2 |
| 4,326,900 | 4/1982 | Hattori et al. | 149/2 |
| 4,329,249 | 5/1982 | Forsberg | 252/34.7 |
| 4,343,663 | 8/1982 | Breza et al. | 149/4 |
| 4,357,184 | 11/1982 | Binet et al. | 149/2 |
| 4,368,133 | 1/1983 | Forsberg | 252/75 |
| 4,383,873 | 5/1983 | Wade et al. | 149/2 |
| 4,391,659 | 7/1983 | Smith | 149/2 |
| 4,394,198 | 7/1983 | Takeschi et al. | 149/21 |
| 4,404,050 | 7/1933 | Yorke et al. | 149/2 |
| 4,435,297 | 3/1984 | Forsberg | 252/34.7 |
| 4,447,348 | 5/1984 | Forsberg | 252/75 |
| 4,448,619 | 5/1984 | Mitchell | 149/21 |
| 4,448,703 | 5/1984 | Forsberg | 252/75 |
| 4,472,215 | 9/1984 | Binet et al. | 149/109.6 |
| 4,490,194 | 12/1984 | Cooper et al. | 149/2 |
| 4,490,195 | 12/1984 | Cooper et al. | 149/2 |
| 4,496,405 | 1/1985 | Cechanski | 149/2 |
| 4,504,276 | 3/1985 | Baker | 44/51 |
| 4,507,215 | 3/1985 | Schroeck | 252/32.7 E |
| 4,522,597 | 11/1985 | Abegg et al. | 149/2 |
| 4,525,225 | 6/1985 | Cechanski | 149/19.5 |
| 4,548,659 | 10/1985 | Jessop | 149/18 |
| 4,554,032 | 11/1985 | Hattori et al. | 149/21 |
| 4,555,278 | 11/1985 | Cescon et al. | 149/21 |
| 4,579,666 | 4/1986 | Schroeck | 252/32.7 E |
| 4,615,751 | 10/1986 | Smith et al. | 149/2 |
| 4,666,620 | 5/1987 | Forsberg | 252/75 |
| 4,708,753 | 11/1987 | Forsberg | 149/2 |
| 4,710,248 | 12/1987 | Yates et al. | 149/21 |
| 4,764,230 | 8/1988 | Bates et al. | 149/21 |
| 4,772,739 | 9/1988 | Forsberg | 558/208 |
| 4,822,433 | 4/1989 | Cooper et al. | 149/2 |
| 4,828,633 | 5/1989 | Forsberg | 149/2 |
| 4,840,687 | 6/1989 | Forsberg et al. | 149/2 |
| 4,844,756 | 7/1989 | Forsberg | 149/2 |

EMULSIFIERS AND EXPLOSIVE EMULSIONS CONTAINING SAME

This is a continuation of co-pending application Ser. No. 07/509,399 filed on Apr. 13, 1990 now abandoned which application is a continuation of U.S. application Ser. No. 07/380,054, filed Jul. 14, 1989, U.S. Pat. No. 4,919,178. Ser. No. 07/380,054 was a continuation-in-part of U.S. Ser. No. 367,185, filed Jun. 16, 1989, U.S. Pat. No. 4,956,028 which was a continuation of U.S Ser. No. 931,377, filed Nov. 14, 1986, U.S. Pat. No. 4,840,687. Ser. No. 07/380,054 was also a continuation-in-part of U S. Ser. No. 137,303, filed Dec. 23, 1987, U.S. Pat. No. 4,863,534. Ser. No. 07/380,054 was also a continuation-in-part of U.S. Ser. No. 265,877, filed Nov. 1, 1988, U.S. Pat. No. 5,047,175 which was a division of U.S. Ser. No. 137,301, filed Dec. 23, 1987 (now U.S. Pat. No. 4,828,633). These prior applications are incorporated herein by reference in their entireties.

TECHNICAL FIELD

This invention relates to novel compositions that have utility as emulsifiers, and to explosive emulsions containing these compositions. More particularly, this invention relates to compositions comprising the reaction product of component (I) with component (II), component (I) comprising certain carboxylic acids or anhydrides, or esters or amides derived therefrom, reacted with ammonia, at least one amine, at least one alkali metal and/or at least one alkaline-earth metal, component (II) comprising certain phosphorus-containing acids, or metal salts of said phosphorus-containing acids, the metals being selected from the group consisting of magnesium, calcium, strontium, chromium, manganese, iron, molybdenum, cobalt, nickel, copper, silver, zinc, cadmium, aluminum, tin, lead, and mixtures of two or more thereof. These compositions are useful as emulsifiers in water-in-oil explosive emulsions.

BACKGROUND OF THE INVENTION

The prior art discloses a large number of dispersants for use in fuels and lubricants which are derivatives of carboxylic acid acylating agents. Typically, the acylating agents are prepared by the reaction of an olefin (e.g., a polyalkylene such as polyisobutylene) or a derivative thereof, containing for example at least about 10 aliphatic carbon atoms and generally at least about 30 or at least about 50 aliphatic carbon atoms, with an unsaturated carboxylic acid or derivative thereof such as acrylic acid, methylacrylate, maleic acid, fumaric acid or maleic anhydride. Dispersants are prepared from the carboxylic acid acylating agents by reaction with, for example, amines characterized by the presence within their structure of at least one N—H group, alcohols, reactive metal or reactive metal compounds, and combinations of the above. The prior art relative to the preparation of such carboxylic acid derivatives is summarized in U.S. Pat. No. 4,234,435.

It also has been suggested that carboxylic acid derivative compositions such as those described above can be post-treated with various reagents to modify and improve the properties of the compositions. Acylated nitrogen compositions prepared by reacting the acylating agents described above with an amine can be post-treated, for example, by contacting the acylated nitrogen compositions thus formed with one or more post-treating reagents such as phosphoric acid, boron oxide, boron oxide hydrate, boron halides, boron acids, esters of boron acid, carbon disulfide, sulfur, sulfur chlorides, alkenyl cyanides, carboxylic acid acylating agents, aldehydes, ketones, epoxides, etc. Lists of the prior art relating to post-treatment of carboxylic ester and amine dispersants with reagents such as those described above are contained in a variety of patents such as U.S. Pat. No. 4,203,855 (Col. 19, lines 16-24) and U.S. Pat. No. 4,234,435 (Col. 42, lines 33-46).

U.S Pat. No. 4,234,435 describes lubricating oils containing carboxylic acid derivative compositions prepared by post-treating acylated amines with a variety of post-treating reagents including hydrocarbyl thiophosphates and hydrocarbyl thiophosphites (Col. 41, lines 67-68).

The use of metal salts, especially zinc salts, of phosphorodithioic acids as extreme pressure (E.P.) agents, corrosion inhibitors and antioxidants in lubricants is disclosed, for example, in U.S. Pat. Nos. 3,390,082; 4,263,150; 4,282,171; 4,289,635; 4,308,154; 4,320,019; 4,357,250; 4,417,990; and 4,446,039.

U.S. Pat. Nos. 4,329,249; 4,368,133; 4,435,297; 4,447,348; 4,448,703; and 4,666,620 disclose the use of nitrogen-containing carboxylic dispersants in water based functional fluids. These dispersants are made by reacting a carboxylic acid acylating agent having at least one hydrocarbyl substituent of from about 12 to about 500 carbon atoms with at least one N-(hydroxyl-substituted hydrocarbyl) amine, hydroxyl-substituted poly(hydrocarbyloxy) analog of said amine, or mixtures thereof. These patents indicate that preferred acylating agents include the substituted succinic acids or anhydrides, such as polyisobutenyl-substituted succinic anhydride, and the amines that are useful include the primary, secondary and tertiary alkanol amines, such as diethylethanolamine. The nitrogen-containing dispersants are useful in dispersing oil-soluble, water-insoluble functional additives in water-based functional fluids. Among the functional additives that can be dispersed is zinc salt of O,O'-di(isooctyl)phosphorodithioic acid.

U.S. Pat. No. 4,772,739 discloses nitrogen- and phosphorus-containing compositions which are useful as E.P., load-carrying and anti-wear agents in water-based functional fluids. The nitrogen- and phosphorus-containing compositions are made by the reaction of (A) at least one carboxylic acid acylating agent, with (B) at least one amine characterized by the presence within its structure of at least one HN<group, and (C) at least one phosphorus-containing acid of the formula

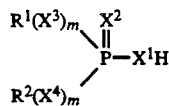

wherein each $X^1$, $X^2$, $X^3$ and $X^4$ is independently oxygen or sulfur, each m is zero or one, and each $R^1$ and $R^2$ is independently a hydrocarbyl group.

European Application 0 156 572 discloses compounds which contain a hydrophobic component and a hydrophilic component covalently bonded together which are useful as surfactants in water-in-oil emulsions. The hydrophobic component is a saturated or unsaturated $C_{30-500}$ hydrocarbon chain, and the hydrophilic component contains an anionic grouping selected from phosphate, phosphonate, sulphate, sulphonate and carboxymethyl. Example 1 discloses a compound derived from poly(isobutenyl) succinic anhydride, ethanolamine, and phosphoric acid. Other examples indicate that diethanolamine or tris(hydroxymethyl) aminoethane can be substituted for the ethanolamine used in Example 1.

Water-in-oil explosive emulsions typically comprise a discontinuous oxidizer phase comprising at least one oxygen-supplying component such as ammonium nitrate, a continuous organic phase comprising at least one carbonaceous fuel, and an emulsifier. Examples of such water-in-oil explosive emulsions are disclosed, inter alia, in U.S. Pat. Nos. 3,447,978; 3,765,964; 3,985,593; 4,008,110; 4,097,316; 4,104,092; 4,110,134; 4,149,916; 4,149,917; 4,218,272; 4,259,977; 4,357,184; 4,371,408; 4,391,659; 4,404,050; 4,409,044; 4,448,619; 4,453,989; and 4,534,809; and U.K. Patent Application 2,050,340A.

U S. Pat. No. 4,216,040 discloses water-in-oil emulsion blasting agents having a discontinuous aqueous phase, a continuous oil or water-immiscible liquid organic phase, and an organic cationic emulsifier having a lipophilic portion and a hydrophilic portion, the lipophilic portion being an unsaturated hydrocarbon chain.

U.S. Pat. No. 4,708,753 discloses water-in-oil emulsions which comprise (A) a continuous oil phase; (B) a discontinuous aqueous phase; (C) a minor emulsifying amount of at least one salt derived from (C)(I) at least one hydrocarbyl-substituted carboxylic acid or anhydride, or ester or amide derivative of said acid or anhydride, the hydrocarbyl substituent of (C)(I) having an average of from about 20 to about 500 carbon atoms, and (C)(II) at least one amine; and (D) a functional amount of at least one water-soluble, oil-insoluble functional additive dissolved in said aqueous phase. These emulsions can be explosive emulsions when the functional additive (D) is an oxygen-supplying salt such as ammonium nitrate.

U.S. Pat. No. 4,710,248 discloses an emulsion explosive composition comprising a discontinuous oxidizer-phase dispersed throughout a continuous fuel phase with a modifier comprising a hydrophilic moiety and a lipophilic moiety. The hydrophilic moiety comprises a carboxylic acid or a group capable of hydrolyzing to a carboxylic acid. The lipophilic moiety is a saturated or unsaturated hydrocarbon chain. The emulsion explosive composition pH is above 4.5.

U.S. Pat. No. 4,822,433 discloses an explosive emulsion composition comprising a discontinuous phase containing an oxygen-supplying component and an organic medium forming a continuous phase wherein the oxygen-supplying component and organic medium are capable of forming an emulsion which, in the absence of a supplementary adjuvant, exhibits an electrical conductivity measured at 60° C., not exceeding 60,000 picomhos/meter. The reference indicates that the conductivity may be achieved by the inclusion of a modifier which also functions as an emulsifier. The modifier is comprised of a hydrophilic moiety and a lipophilic moiety. The lipophilic moiety can be derived from a poly[alk(en)yl] succinic anhydride. Poly(isobutylene) succinic anhydride having a number average molecular weight in the range of 400 to 5000 is specifically identified as being useful. The hydrophilic moiety is described as being polar in character, having a molecular weight not exceeding 450 and can be derived from polyols, amines, amides, alkanol amines and heterocyclics. Example 5 of this reference discloses the use as the modifier of a 1:1 condensate of polyisobutenyl succinic anhydride (number average molecular weight=1200) and ethanol amine which had been reacted with one mole of phosphoric acid to form a monophosphate derivative. The emulsifier disclosed in this example is described as being useful in making an emulsion useful for making cartridges.

South African Patent 87/8540 discloses an explosive composition comprising a discontinuous oxidizer phase comprising at least one oxygen-supplying component, a continuous organic phase comprising at least one water-immiscible organic liquid, and an emulsifying amount of at least one nitrogen-containing emulsifier derived from (A) at least one carboxylic acylating agent, (B) at least one polyamine, and (C) at least one acid or acid-producing compound capable of forming at least one salt with said polyamine. Examples of (A) include polyisobutenyl succinic acid or anhydride. Examples of (B) include the alkylene polyamines. Examples of (C) include the phosphorus acids (e.g., O,S-dialkylphosphorotrithioic acid). These explosive compositions can be water-in-oil emulsions or melt-in-oil emulsions.

SUMMARY OF THE INVENTION

The present invention provides for a composition comprising the reaction product of component (I) with component (II);

component (I) comprising:

(A) the reaction product of (A)(i) at least one carboxylic acid or anhydride, or ester or amide derived from said acid or anhydride, with (A)(ii) ammonia, at least one amine, at least one alkali metal and/or at least one alkaline-earth metal; or (B) a composition comprising (B)(i) the reaction product of (B)(i)(a) at least one high-molecular weight hydrocarbyl-substituted carboxylic acid or anhydride, or ester or amide derived from said high-molecular weight acid or anhydride, with (B)(i)(b) ammonia, at least one amine, at least one alkali metal and/or at least one alkaline-earth metal, component (B)(i)(a) having at least one hydrocarbyl substituent having an average of about 20 to about 500 carbon atoms; and (B)(ii) the reaction product of (B)(ii)(a) at least one low-molecular weight carboxylic acid or anhydride, or ester or amide derived from said low-molecular weight acid or anhydride, with (B)(ii)(b) ammonia, at least one amine, at least one alkali metal and/or at least one alkaline-earth metal, component (B)(ii)(a) optionally having at least one hydrocarbyl substituent having an average of up to about 18 carbon atoms; or (C) a composition comprising (C)(i) the reaction product of (C)(i)(a) at least one high-molecular weight hydrocarbyl-substituted polycarboxylic acid or anhydride, or ester or amide derived from said high-molecular weight polycarboxylic acid or anhydride, with (C)(i)(b) ammonia, at least one amine, at least one alkali metal and/or at least one alkaline-earth metal, component (C)(i)(a) having at least one hydrocarbyl substituent having an average of about 20 to about 500 carbon atoms; and (C)(ii) the reaction product of (C)(ii)(a) at least one low-molecular weight polycarboxylic acid or anhydride, or ester or amide derived from said low-molecular weight polycarboxylic acid or anhydride, with (C)(ii)(b) ammonia, at least one amine, at least one alkali metal and/or at least one alkaline-earth metal, component (C)(ii)(a) optionally having at least one hydrocarbyl substituent having an average of up to about 18 carbon atoms;

said components (C)(i) and (C)(ii) being coupled together by (C)(iii) at least one compound having (C)(iii)(a) two or more primary amino groups, (C)(iii)(b) two or more secondary amino groups, (C)(iii)(c) at least one primary amino group and at least one secondary amino group, (C)(iii)(d) at least two hydroxyl groups, or (C)(iii)(e) at least one primary or secondary amino group and at least one hydroxyl group; or (D) mixture of two or more of (A), (B) and (C);

component (II) comprising:

(A') at least one phosphorus-containing acid represented by the formula

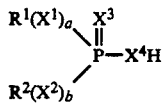

wherein $X^1$, $X^2$, $X^3$ and $X^4$ are independently oxygen or sulfur; a and b are independently zero or one, and $R^1$ and $R^2$ are independently hydrocarbyl groups; or (B') at least one salt derived from said phosphorous-containing acid (A') and at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof; or (C') mixture of (A') and (B');

with the proviso that when component (II) is (A'), component (I) is (B), (C) or a mixture of (B) and (C). The invention further provides for concentrates comprising the foregoing composition. The invention further provides for explosive emulsions comprising a discontinuous oxidizer phase comprising at least one oxygen-supplying component, a continuous organic phase comprising at least one carbonaceous fuel, and an emulsifying amount of the foregoing composition.

DESCRIPTION OF THE PREFERRED EMBODIMENTS

The term "emulsion" as used in this specification and in the appended claims is intended to cover not only water-in-oil emulsions, but also explosive compositions derived from such emulsions wherein at temperatures below that at which the emulsion is formed the discontinuous phase is solid or in the form of droplets of supercooled liquid.

The term "hydrocarbyl" is used herein to include:

(1) hydrocarbyl groups, that is, aliphatic (e.g., alkyl or alkenyl), alicyclic (e.g., cycloalkyl, cycloalkenyl), aromatic, aliphatic- and alicyclic-substituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three non-hydrocarbon groups or heteroatoms and preferably no more than one, will be present for each 10 carbon atoms in a hydrocarbyl group. Typically, there will be no such groups or heteroatoms in a hydrocarbyl group and it will, therefore, be purely hydrocarbyl.

The hydrocarbyl groups are preferably free from acetylenic unsaturation; ethylenic unsaturation, when present will generally be such that there is no more than one ethylenic linkage present for every 10 carbon-to-carbon bonds. The hydrocarbyl groups are often completely saturated and therefore contain no ethylenic unsaturation.

The term "lower" as used herein in conjunction with terms such as alkyl, alkenyl, alkoxy, and the like, is intended to describe such groups which contain a total of up to 7 carbon atoms.

The term "water-soluble" refers to materials which are soluble in water to the extent of at least one gram per 100 milliliters of water at 25° C.

The term "oil-soluble" refers to materials which are soluble in mineral oil to the extent of at least one gram per 100 milliliters of oil at 25° C.

Component (A)(i), (B)(i)(a), (B)(ii)(a), (C)(i)(a) and (C)(ii)(a):

Components (B)(i)(a) and (C)(i)(a) are high-molecular weight hydrocarbyl-substituted carboxylic acids or anhydrides, or esters or amides derived therefrom. Typically these high-molecular weight acids or anhydrides or derivatives have hydrocarbyl substituents containing an average of about 20 to about 500 carbon atoms, more preferably about 30 to about 500 carbon atoms, more preferably about 40 to about 500 carbon atoms, more preferably about 50 to about 500 carbon atoms.

Components (B)(ii)(a) and (C)(ii)(a) are low-molecular weight carboxylic acids or anhydrides, or esters or amides derived therefrom. These low-molecular weight acids or anhydrides or derivatives can optionally include a hydrocarbyl substituent of up to about 18 carbon atoms, preferably about 4 to about 18 carbon atoms, more preferably about 8 to about 18 carbon atoms, more preferably about 10 to about 18 carbon atoms, more preferably about 12 to about 18 carbon atoms, more preferably about 16 to about 18 carbon atoms. The hydrocarbyl substituent can be derived from at least one compound selected from the group consisting of ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene and 1-octadecene. The hydrocarbyl substituent can be derived from an alpha-olefin fractions such as those selected from the group consisting of $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, etc.

Component (A)(i) can be either a low-molecular weight or a high-molecular weight carboxylic acid or anhydride, or ester or amide derived therefrom. When the inventive compositions are used as emulsifiers for explosive emulsions, such compositions are soluble in the organic phase of such emulsions. The number of carbon atoms present in component (A)(i) is important in contributing to the desired solubility of these compositions. The sum of the carbon atoms in components (I) and (II) must be sufficient to render the composition oil-soluble. Generally, if component (A)(i) contains a large number of carbon atoms, components (A)(ii) and (II) may be selected from those compounds containing fewer carbon atoms. Conversely, if components (A)(ii) and/or (II) contain a large number of carbon atoms, component (A)(i) can be selected from those compounds containing fewer carbon atoms. Usually, in order to provide the desired hydrocarbon solubility, the sum of the carbon atoms in components (A)(i), (A)(ii) and (II) should total at least about 10 carbon atoms, more preferably at least about 30 carbon atoms, more preferably at least about 50 carbon atoms.

Components (A)(i), (B)(i)(a) and (B)(ii)(a) can be mono- or polycarboxylic acids or anhydrides, or esters or amides derived therefrom. Components (C)(i)(a) and (C)(ii)(a) are polycarboxylic acids or anhydrides, or esters or amides derived therefrom. Each of these components can be aliphatic or aromatic. These components may contain polar substituents provided that the polar substituents are not present in portions sufficiently large to alter significantly the hydrocarbon character of the acylating agent. Typical suitable polar substituents include halo, such as chloro and bromo, oxo, oxy, formyl, sulfenyl, sulfinyl, thio, nitro, etc. Such polar substituents, if present, preferably do not exceed about 10% by weight of the total weight of the hydrocarbon portion of these components, exclusive of the carboxyl groups.

The low-molecular weight monocarboxylic acids contemplated for use in this invention include saturated and unsaturated acids. Examples of such useful acids include formic acid, acetic acid, chloroacetic acid, propionic acid, butyric acid, acrylic, benzoic acid, butanoic acid, cyclohexanoic, dodecanoic acid, palmitic acid, decanoic acid, oleic acid, lauric acid, stearic acid, myristic acid, linoleic acid, linolenic acid, naphthenic acid, chlorostearic acid, tall oil acid, etc. Anhydrides as well as esters and amides derived from these acids can also be used. Mixtures of two or more of the foregoing can also be used.

Examples of low-molecular weight polycarboxylic acids and anhydrides that can be used include dicarboxylic acids and derivatives such as maleic acid, maleic anhydride, chloromaleic anhydride, malonic acid, succinic acid, succinic anhydride, glutaric acid, glutaric anhydride, adipic acid, pimelic acid, azelaic acid, sebacic acid, glutaconic acid, citraconic acid, itaconic acid, allyl succinic acid, cetyl malonic acid, tetrapropylene-substituted succinic anhydride, etc. Esters and amides derived from these acids and anhydrides can be used.

An extensive discussion of these low-molecular weight carboxylic acids can be found in Kirk-Othmer "Encyclopedia of Chemical Technology" Third Edition, 1978, John Wiley & Sons, New York, pp. 814-871; these pages being incorporated herein by reference.

Low-molecular weight hydrocarbyl-substituted succinic acid and anhydrides can be used. These acids and anhydrides can be represented by the formulae

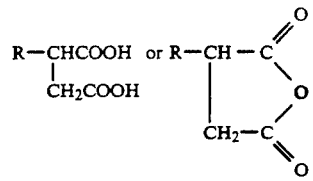

wherein R is a hydrocarbyl group of up to about 18 carbon atoms, preferably about 4 to about 18 carbon atoms, more preferably about 8 to about 18 carbon atoms, more preferably about 10 to about 18 carbon atoms, more preferably about 12 to about 18 carbon atoms, more preferably about 16 to about 18 carbon atoms. Preferably, R is an aliphatic or alicyclic hydrocarbyl group with less than 10% of its carbon-to-carbon bonds being unsaturated. Examples of such groups include 4-butylcyclohexyl, di(isobutyl), decyl, etc. The hydrocarbyl group can be derived from an olefin such as ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene, 1-octadecene, etc. The hydrocarbyl group can also be derived from an olefin fraction such as $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, etc.

The monocarboxylic acids include isoaliphatic acids, i.e., acids having one or more lower acyclic pendant alkyl groups. Such acids often contain a principal chain having from about 14 to about 20 saturated, aliphatic carbon atoms and at least one but usually no more than about four pendant acyclic alkyl groups. These acids are categorized as low-molecular weight or high-molecular weight acids within the scope of the invention depending upon the total number of carbon atoms in the principal chain and pendant groups; low-molecular weight acids have up to about 18 carbon atoms, while high-molecular weight acids have about 20 or more carbon atoms. The principal chain of the acid is exemplified by groups derived from tetradecane, pentadecane, hexadecane, heptadecane, octadecane, and eicosane. The pendant group is preferably a lower alkyl group such as methyl, ethyl, n-propyl, isopropyl, n-butyl, isobutyl, tert-butyl, n-hexyl, or other groups having up to about 7 carbon atoms. The pendant group may also be a polar-substituted alkyl group such as chloromethyl, bromobutyl, methoxyethyl, or the like, but it preferably contains no more than one polar substituent per group. Specific examples of such isoaliphatic acids include 10-methyl-tetradecanoic acid, 11-methyl-pentadecanoic acid, 3-ethyl-hexadecanoic acid, 15-methyl-heptadecanoic acid, 16-methyl-heptadecanoic acid, 6-methyl-octadecanoic acid, 8-methyl-octadecanoic acid, 10-methyl-octadecanoic acid, 14-methyl-octadecanoic acid, 16-methyl-octadecanoic acid, 15-ethyl-heptadecanoic acid, 3-chloromethyl-nonadecanoic acid, 7,8,9,10-tetramethyl-octadecanoic acid, and 2,9,10-trimethyl-octadecanoic acid.

The isoaliphatic acids include mixtures of branch-chain acids prepared by the isomerization of commercial fatty acids of, for example, about 16 to about 20 carbon atoms. A useful method involves heating the fatty acid at a temperature above about 250° C. and a pressure between about 200 and 700 psi, distilling the crude isomerized acid, and hydrogenating the distillate to produce a substantially saturated isomerized acid. The isomerization can be promoted by a catalyst such as mineral clay, diatomaceous earth, aluminum chloride, zinc chloride, ferric chloride, or some other Friedel-Crafts catalyst. The concentration of the catalyst may be as low as about 0.01%, but more often from about 0.1% to about 3% by weight of the isomerization mixture. Water also promotes the isomerization and a small amount, from about 0.1% to about 5% by weight, of water may thus be advantageously added to the isomerization mixture. The unsaturated fatty acids from which the isoaliphatic acids may be derived include oleic acid, linoleic acid, linolenic acid, and commercial fatty acid mixtures such as tall oil acids.

The high-molecular weight mono- and polycarboxylic acids and anhydrides are well known in the art and have been described in detail, for example, in the following U.S., British and Canadian patents: U.S. Pat. Nos. 3,024,237; 3,087,936; 3,163,603; 3,172,892; 3,215,707; 3,219,666; 3,231,587; 3,245,910; 3,254,025; 3,271,310; 3,272,743; 3,272,746; 3,278,550; 3,288,714; 3,306,907; 3,307,928; 3,312,619; 3,341,542; 3,346,354; 3,367,943; 3,373,111; 3,374,174; 3,381,022; 3,394,179; 3,454,607; 3,346,354; 3,470,098; 3,630,902; 3,652,616; 3,755,169; 3,868,330; 3,912,764; 4,234,435; and 4,368,133; British Patents 944,136; 1,085,903; 1,162,436; and 1,440,219; and Canadian Patent 956,397. These patents are incorporated herein by reference for their disclosures of such acids and anhydrides and the methods for making them.

As disclosed in the foregoing patents, there are several processes for preparing these high-molecular weight acids and anhydrides. Generally, these processes involve the reaction of (1) an ethylenically unsaturated carboxylic acid, acid halide, anhydride or ester reactant with (2) an ethylenically unsaturated hydrocarbon or a chlorinated hydrocarbon at a temperature within the range of about 100–300° C. The chlorinated hydrocarbon or ethylenically unsaturated hydrocarbon reactant preferably contains at least about 10 carbon atoms, more preferably at least about 20 carbon atoms, more preferably at least about 30 carbon atoms, more preferably at least about 40 carbon atoms, more preferably at least about 50 carbon atoms, and may contain polar substituents, oil-solubilizing pendant groups, and be unsaturated within the general limitations explained hereinabove.

When preparing the hydrocarbyl-substituted carboxylic acids, the carboxylic acid reactant usually corresponds to the formula $R_o$—$(COOH)_n$, where $R_o$ is characterized by the presence of at least one ethylenically unsaturated carbon-to-carbon covalent bond and n is an integer from 1 to about 6 and preferably 1 or 2. The acidic reactant can also be the corresponding carboxylic acid halide, anhydride, ester, or other equivalent acylating agent and mixtures of one or more of these. Ordinarily, the total number of carbon atoms in the acidic reactant will not exceed about 20, preferably this number will not exceed about 10 and generally will not exceed about 6. Preferably the acidic reactant will have at least one ethylenic linkage in an alpha-, beta-position with respect to at least one carboxyl function. Exemplary acidic reactants are acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, and the like. Preferred acid reactants include acrylic acid, methacrylic acid, maleic acid, and maleic anhydride.

The ethylenically unsaturated hydrocarbon reactant and the chlorinated hydrocarbon reactant used in the preparation of these high-molecular weight carboxylic acids and anhydrides can be high molecular weight, substantially saturated petroleum fractions and substantially saturated olefin polymers and the corresponding chlorinated products. Polymers and chlorinated polymers derived from mono-olefins having from 2 to about 30 carbon atoms, preferably 2 to about 20 carbon atoms, more preferably 2 to about 12 carbon atoms, more preferably 2 to about 8 carbon atoms, more preferably 2 to about 6 carbon atoms are useful. Useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, 4-octene, etc.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of hydrocarbon solubility, the interpolymers contemplated for use in preparing the high-molecular weight carboxylic acids and anhydrides of this invention are preferably substantially aliphatic and substantially saturated. That is, they should contain at least about 80% and preferably at least about 95%, on a weight basis, of units derived from aliphatic mono-olefins. Preferably, they contain no more than about 5% olefinic linkages based on the total number of the carbon-to-carbon covalent linkages present.

In one embodiment of the invention, the polymers and chlorinated polymers are obtained by the polymerization of a $C_4$ refinery stream having a butene content of about 35% to about 75% by weight and an isobutene content of about 30% to about 60% by weight in the presence of a Lewis acid catalyst such as aluminum chloride or boron trifluoride. These polyisobutenes preferably contain predominantly (that is, greater than about 80% of the total repeat units) isobutene repeat units of the configuration.

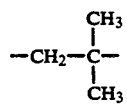

The chlorinated hydrocarbons and ethylenically unsaturated hydrocarbons used in the preparation of the high-molecular weight carboxylic acids and anhydrides preferably have up to about 500 carbon atoms per molecule. Preferred high-molecular weight carboxylic acids and anhydrides are those containing hydrocarbyl groups of from about 20 to about 500 carbon atoms, more preferably from about 30 to about 500 carbon atoms, more preferably from about 40 to about 500 carbon atoms, more preferably from about 50 to about 500 carbon atoms.

The high-molecular weight carboxylic acids and anhydrides may also be prepared by halogenating a high molecular weight hydrocarbon such as the above-described olefin polymers to produce a polyhalogenated product, converting the polyhalogenated product to a polynitrile, and then hydrolyzing the polynitrile. They may be prepared by oxidation of a high molecular weight polyhydric alcohol with potassium permanganate, nitric acid, or a similar oxidizing agent. Another method involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

The high-molecular weight carboxylic acid and anhydrides can also be obtained by reacting chlorinated carboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in U.S. Pat. No. 3,340,281, this patent being incorporated herein by reference.

The low- and high-molecular weight carboxylic acid anhydrides can be obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid groups separated by no more than three carbon atoms such as substituted succinic or glutaric acid, whereas linear anhydrides are usually obtained from polycarboxylic acids having the acid groups separated by four or more carbon atoms.

The low-molecular weight and high-molecular weight carboxylic acids used herein include acid-producing derivatives thereof (in addition to the anhydrides) such as acyl halides and the like. Thus, the term "carboxylic acid" when used in the claims herein also refers to the acyl halides of such acids. These acyl halides can be prepared by the reaction of the carboxylic acids or their anhydrides with a halogenating agent such as phosphorus tribromide, phosphorus pentachloride or thionyl chloride using known techniques.

Hydrocarbyl-substituted succinic acids and anhydrides are preferred high-molecular weight carboxylic acids and anhydrides. These acids and anhydrides can be prepared by reacting maleic anhydride with an olefin or a chlorinated hydrocarbon such as a chlorinated polyolefin. The reaction involves merely heating the two reactants at a temperature in the range of about 100° C. to about 300° C., preferably, about 100° C. to about 200° C. The product from this reaction is a hydrocarbyl-substituted succinic anhydride wherein the substituent is derived from the olefin or chlorinated hydrocarbon. The product may be hydrogenated to remove all or a portion of any ethylenically unsaturated covalent linkages by standard hydrogenation procedures, if desired. The hydrocarbyl-substituted succinic anhydrides may be hydrolyzed by treatment with water or steam to the corresponding acid. The high-molecular weight hydrocarbyl-substituted succinic acids and anhydrides can be represented by the formulae

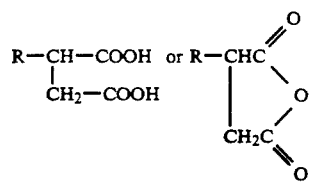

wherein R is the hydrocarbyl substituent. Preferably R contains from about 20 to about 500 carbon atoms, more preferably from about 30 to about 500 carbon atoms, more preferably from about 40 to about 500 carbon atoms, more preferably from about 50 to about 500 carbon atoms.

The Alcohols Useful In Making the Carboxylic Acid Ester Derivatives (A)(i), (B)(i)(a), (B)(ii)(a), (C)(i)(a) and (C)(ii)(a):

The alcohols useful in making the carboxylic acid ester derivatives (A)(i), (B)(i)(a), (B)(ii)(a), (C)(i)(a) and (C)(ii)(a) of this invention include those compounds of the general formula:

$$R_1\text{—(OH)}_m$$

wherein $R_1$ is a monovalent or polyvalent organic group joined to the —OH groups through carbon-to-oxygen bonds (that is, —COH wherein the carbon is not part of a carbonyl group) and m is an integer of from 1 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the mono- and polyhydric alcohols corresponding to the formula $R_1\text{—(OH)}_m$ preferably contain not more than about 40 carbon atoms, more preferably not more than about 20 carbon atoms. The alcohols may contain non-hydrocarbon substituents or groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$— where X is —O— or —S—).

Among the polyoxyalkylene alcohols suitable for use in the preparation of the ester derivatives of this invention are the commercially available polyoxyalkylene alcohols that include the polyoxyethylated amines, amides, and quaternary salts available from Armour Industrial Chemical Co. under the names ETHODUOMEEN polyethoxylated high-molecular-weight aliphatic diamines; ETHOMEEN, polyethoxylated aliphatic amines containing alkyl groups in the range of about 8 to about 18 carbon atoms; ETHOMID, polyethoxylated high-molecular-weight amides; and ETHOQUAD, polyethoxylated quaternary ammonium chlorides derived from long-chain amines.

Useful polyoxyalkylene alcohols and derivatives thereof include the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about 40 carbon atoms. Specific hydrocarbyl groups include methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about 20 carbon atoms. Members of this class of alcohols are commercially available from various sources; e.g., PLURONICS, polyols available from Wyandotte Chemicals Corporation; POLYGLYCOL 112-2, a liquid triol derived from ethyleneoxide and propylene-oxide available from Dow Chemical Co.; and TERGITOLS, dodecylphenyl or nonylphenyl polyethylene glycol ethers, and UCONS, polyalkylene glycols and various derivatives thereof, both available from Union Carbide Corporation. However, the alcohols used must have an average of at least one free alcoholic hydroxyl group per molecule of polyoxyalkylene alcohol. For purposes of describing these polyoxyalkylene alcohols, an alcoholic hydroxyl group is one attached to a carbon atom that does not form part of an aromatic nucleus.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least one such OH group. However, the remaining OH group can be esterified with a monobasic, aliphatic or aromatic carboxylic acid of up to about 20 carbon atoms such as acetic acid, propionic acid, oleic acid, stearic acid, benzoic acid, and the like. The monoethers of these alkylene glycols and polyoxyalkylene glycols are also useful. These include the monoaryl ethers, monoalkyl ethers, and monoaralkyl ethers of these alkylene glycols and polyoxyalkylene glycols. This group of alcohols can be represented by the formula

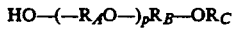

wherein $R_A$ and $R_B$ are independently alkylene groups of from about 2 to 8 carbon atoms; and $R_C$ is aryl (e.g., phenyl), lower alkoxy phenyl, or lower alkyl phenyl, or lower alkyl (e.g., ethyl, propyl, terbutyl, pentyl, etc.); and aralkyl (e.g., benzyl, phenylethyl, phenylpropyl, p-ethylphenylethyl, etc.); p is from zero to about eight, preferably from about 2 to 4. Polyoxyalkylene glycols where the alkylene groups are ethylene or propylene and p is at least two as well as the monoethers thereof as described above are useful.

The monohydric and polyhydric alcohols useful in this invention include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 1 to about 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxy-biphenyl, hydroquinone, pyrogallol, phloroglucinol, hexylresorcinol, orcin, quaiacol, 2-chlorophenol, 2,4-dibutylphenol, propene-tetramer-substituted phenol, didodecylphenol, 4,4'-methylene-bis-methylene-bis-phenol, alpha-decyl-beta-naphthol, polyisobutenyl-(molecular weight of about 1000)-substituted phenol, the condensation product of heptylphenol with about 0.5 mole of formaldehyde, the condensation product of octylphenol with acetone, di(hydroxyphenyl)oxide, di-(hydroxyphenyl)-sulfide, di(hydroxyphenyl)-disulfide, and 4-cyclohexyl-phenol. Phenol itself and aliphatic hydrocarbon-substituted phenols, e.g., alkylated phenols having up to 3 aliphatic hydrocarbon substituents are useful. Each of the aliphatic hydrocarbon substituents may contain about 100 or more carbon atoms but usually will have from 1 to about 20 carbon atoms. Alkyl and alkenyl groups are the preferred aliphatic hydrocarbon substituents.

Further specific examples of monohydric alcohols which can be used include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tertbutyl alcohol, 5-bromo-dodecanol, nitro-octadecanol, and dioleate of glycerol. Alcohols useful in this invention may be unsaturated alcohols such as allyl alcohol, cinnamyl alcohol, 1-cyclohexene-3-ol and oleyl alcohol.

Other specific alcohols useful in this invention are the ether alcohols and amino alcohols including, for example, the oxyalkylene-, oxyarylene-, amino-alkylene-, and amino-arylene-substituted alcohols having one or more oxyalkylene, aminoalkylene or amino-aryleneoxy-arylene groups. These alcohols are exemplified by the Cellosolves, (products of Union Carbide identified as mono- and dialkyl ethers of ethylene glycol and their derivatives), the Carbitols (products of Union Carbide identified as mono- and dialkyl ethers of diethylene glycol and their derivatives), phenoxyethanol, heptyl-phenyl-(oxypropylene)$_6$—OH, octyl-(oxyethylene)$_3$-o—OH, phenyl-(oxyoctylene)$_2$—OH, mono-(heptyl-phenyloxypropylene)-substituted glycerol, poly-(styreneoxide), aminoethanol, 3-aminoethylpentanol, di(hydroxyethyl)amine, p-aminophenol, tri(hydroxypropyl)amine, N-hydroxyethyl ethylenediamine, N,N,N',N'-tetrahydroxytrimethylenediamine, and the like.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful. Further specific examples of such partially esterified polyhydric alcohols are the monooleate of sorbitol, distearate of sorbitol, monooleate of glycerol, monostearate of glycerol, di-dodecanoate of erythritol, and the like.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like. Aliphatic alcohols containing at least about 3 hydroxyl groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol-(trimethylolethane), 2-hydroxymethyl-2-ethyl-1,3-propanediol-(trimethylpropane), 1,2,4-hexanetriol, and the like.

The carboxylic acids or anhydrides can be reacted with the alcohols according to conventional esterification techniques to form the ester derivatives. This normally involves heating the acid or anhydride with the alcohol, optionally in the presence of a normally liquid, substantially inert, organic liquid solvent/diluent and/or in the presence of esterification catalyst. Temperatures of at least about 30° C. up to the decomposition temperature of the reaction component and/or product having the lowest such temperature can be used. This temperature is preferably in the range of about 50° C. to about 130° C., more preferably about 80° C. to about 100° C. when a carboxylic anhydride is used as the carboxylic reactant. On the other hand, when the carboxylic reactant is an acid, the temperature is preferably in the range of about 100° C. up to about 300° C. with temperatures of about 140° C. to 250° C. often being employed. Usually, up to about 0.95 equivalent, preferably from about 0.05 to about 0.95 equivalent of alcohol are used for each equivalent of acid or anhydride. Preferably, about 0.5 equivalent of alcohol per equivalent of acid or anhydride is employed An equivalent of an alcohol is its molecular weight divided by the total number of hydroxyl groups present in the molecule. Thus, an equivalent weight of ethanol is its molecular weight while the equivalent weight of ethylene glycol is one-half its molecular weight. The number of equivalents of the acid or anhydride depends on the total number of carboxylic functions (e.g., carboxylic acid or carboxylic anhydride groups) present in the acid or anhydride. Thus, the number of equivalents of the acid or anhydride will vary with the number of carboxy groups present therein. In determining the number of equivalents of the acid or anhydride, those carboxyl functions which are not capable of reacting as a carboxylic acid acylating agent are excluded. In general, however, there is one equivalent of acid or anhydride for each carboxy group in the acid or anhydride. For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of acid or anhydride available to react with the alcohol can be readily determined by one skilled in the art.

Many issued patents disclose procedures for reacting carboxylic acids and anhydrides with alcohols to produce acidic esters and neutral esters. These same techniques are applicable to preparing the esters of this invention. All that is required is that the acid and/or anhydride of this invention is substituted for the carboxylic acid acylating reagents discussed in these patents, usually on an equivalent weight basis. The following U.S. Patents are expressly incorporated herein by references for their disclosure of suitable methods for the preparation of such esters: U.S. Pat. Nos. 3,331,776; 3,381,022; 3,522,179; 3,542,680; 3,697,428; and 3,755,169.

The Amines Useful In Making the Amide Derivatives (A)(i), (B)(i)(a), (B)(ii)(a), (C)(i)(a) and (C)(ii)(a):

The amines useful in making the carboxylic acid amide derivatives (A)(i), (B)(i)(a), (B)(ii)(a), (C)(i)(a) and (C)(ii)(a) include primary amines and secondary amines. Ammonia can also be used. The amines are characterized by the presence within their structure of at least one H-N< group and/or at least one -NH$_2$ group. These amines can be monoamines or polyamines. Hydrazine and substituted hydrazines containing up to three substituents are included as amines suitable for preparing the amide derivatives. Mixtures of two or of the foregoing can be used.

The amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. The amines may also contain non-hydrocarbon substituents or groups as long as these groups do not significantly interfere with the reaction of the amines with the carboxylic acids and derivatives thereof of this invention. Such non-hydrocarbon substituents or groups include lower alkoxy, lower alkyl, mercapto, nitro, and interrupting groups such as —O— and —S— (e.g., as in such groups as —CH$_2$CH$_2$—X— CH$_2$CH$_2$— where X is —O— or —S—).

With the exception of the branched polyalkylene polyamines, the polyoxyalkylene polyamines and the high molecular weight hydrocarbyl-substituted amines described more fully hereinafter, the amines used in this invention ordinarily contain less than about 40 carbon atoms in total and usually not more than about 20 carbon atoms in total.

Aliphatic monoamines include mono-aliphatic and di-aliphatic-substituted amines wherein the aliphatic groups can be saturated or unsaturated and straight or branched chain. Thus, they are primary or secondary aliphatic amines. Such amines include, for example, mono- and di-alkyl-substituted amines, mono- and dialkenyl-substituted amines, and amines having one N-alkenyl substituent and one N-alkyl substituent, and the like. The total number of carbon atoms in these aliphatic monoamines preferably does not exceed about 40 and usually does not exceed about 20 carbon atoms. Specific examples of such monoamines include ethylamine, di-ethylamine, n-butylamine, di-n-butylamine, allylamine, isobutylamine, cocoamine, stearylamine, laurylamine, methyllaurylamine, oleylamine, N-methyloctylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)ethylamine, benzylamine, phenylethylamine, and 3-(furylpropyl) amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl) amine, naphthylamine, N-(n-butyl) aniline, and the like. Examples of aliphatic-substituted, cycloaliphatic-substituted, and heterocyclic-substituted aromatic monoamines include paraethoxyaniline, paradodecylamine, cyclohexyl-substituted naphthylamine and thienyl-substituted aniline.

Suitable polyamines include aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamine, N-N'-di-n-butylparaphenylene diamine, bis-(para-aminophenyl)-methane, 1,4-diaminocyclohexane, and the like.

Heterocyclic mono- and polyamines can also be used. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The 5- and 6-membered heterocyclic rings are preferred.

Among the suitable heterocyclics are aziridines, azetidines, azolidines, tetra- and di-hydropyridines, pyrroles, indoles, piperadines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro-derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

Also suitable as amines are the aminosulfonic acids and derivatives thereof corresponding to the formula:

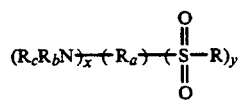

wherein R is OH, NH$_2$, ONH$_4$, etc.; R$_a$ is a polyvalent organic group having a valence equal to x+y; R$_b$ and R$_c$ are each independently hydrogen, hydrocarbyl or substituted hydrocarbyl with the proviso that at least one of R$_b$ and R$_c$ is hydrogen per aminosulfonic acid molecule; x and y are each integers equal to or greater than one. Each aminosulfonic reactant is characterized by at least one HN< or H$_2$N- group and at least one

group. These sulfonic acids can be aliphatic, cycloaliphatic or aromatic aminosulfonic acids and the corresponding functional derivatives of the sulfo group. Specifically, the aminosulfonic acids can be aromatic aminosulfonic acids, that is, where R$_a$ is a polyvalent aromatic group such as phenylene where at least one

group is attached directly to a nuclear carbon atom of the aromatic group. The aminosulfonic acid may also be a mono-amino aliphatic sulfonic acid; that is, an acid where x is one and $R_a$ is a polyvalent aliphatic group such as ethylene, propylene, trimethylene, and 2-methylene propylene. Other suitable aminosulfonic acids and derivatives thereof useful as amines in this invention are disclosed in U.S. Pat. Nos. 3,029,250; 3,367,864; and 3,926,820; which are incorporated herein by reference.

Hydrazine and substituted-hydrazine can also be used as amines in this invention. At least one of the nitrogens in the hydrazine must contain a hydrogen directly bonded thereto. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)N'-(n-butyl)-hydrazine, N-(para-nitrophenyl)-hydrazine, N-(para-nitrophenyl)-N-methylhydrazine, N,N'-di-(para-chlorophenol)-hydrazine, N-phenyl-N'-cyclohexylhydrazine, and the like.

The high molecular weight hydrocarbyl amines, both monoamines and polyamines, which can be used as amines in this invention are generally prepared by reacting a chlorinated polyolefin having a molecular weight of at least about 400 with ammonia or an amine. The amines that can be used are known in the art and described, for example, in U.S. Pat. Nos. 3,275,554 and 3,438,757, both of which are incorporated herein by reference. These amines must possess at least one primary or secondary amino group.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

group per nine amino units present on the main chain; for example, 1-4 of such branched chains per nine units on the main chain, but preferably one side chain unit per nine main chain units. Thus, these polyamines contain at least three primary amino groups and at least one tertiary amino group. These amines may be expressed by the formula:

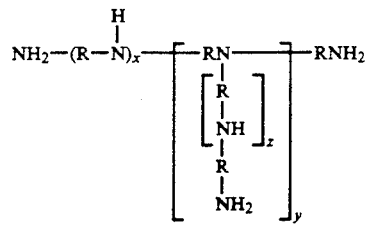

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

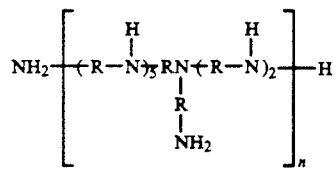

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

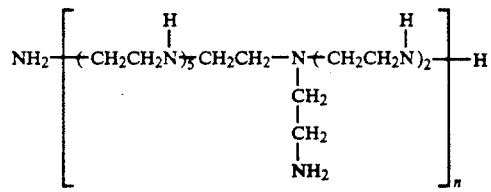

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable amines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

wherein m has a value of from about 3 to about 70, preferably from about 10 to about 35; and the formula:

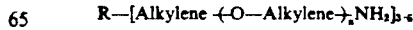

wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

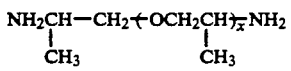

wherein x has a value of from about 3 to about 70, preferably from about 10 to 35; and

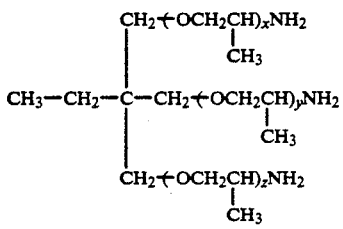

wherein x+y+z have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Texaco Chemical Company, Inc. under the trade name "Jeffamine". U.S. Pat. Nos. 3,804,763 and 3,948,800 are incorporated herein by reference for their disclosure of such polyoxyalkylene polyamines.

Useful amines are the alkylene polyamines, including the polyalkylene polyamines, as described in more detail hereafter. The alkylene polyamines include those conforming to the formula:

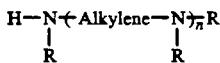

wherein n is from 1 to about 10; each R is independently a hydrogen atom or a hydrocarbyl group or hydroxy-substituted hydrocarbyl group having up to about 700 carbon atoms, preferably up to about 100 carbon atoms, more preferably up to about 50 carbon atoms, more preferably up to about 30 carbon atoms, and the "Alkylene" group has from about 1 to about 10 carbon atoms with the preferred alkylene being ethylene or propylene. Useful are the alkylene polyamines wherein each R" is hydrogen with the ethylene polyamines, and mixtures of ethylene polyamines being particularly preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, N-(2-aminoethyl) piperazine, 1,4-bis(2-aminoethyl) piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Hydroxyalkyl alkylene polyamines having one or more hydroxyalkyl substituents on the nitrogen atoms, are also useful in preparing compositions of the present invention. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

Alkoxylated alkylene polyamines (e.g., N,N-(diethanol)-ethylene diamine) can be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

To prepare the carboxylic acid amide derivatives (A)(i), (B)(i)(a), (B)(ii)(a), (C)(i)(a) or (C)(ii)(a), the corresponding acid or anhydride (A)(i), (B)(i)(a), (B)(ii)(a), (C)(i)(a) or (C)(ii)(a), and ammonia or one or more of the above-described primary or secondary amines are mixed together and heated, optionally in the presence of a normally liquid, substantially inert organic liquid solvent/diluent, at temperatures in the range of from about 50° C. to about 130° C., preferably from about 80° C. to about 110° C. The acid or anhydride, and ammonia and/or amine are reacted in amounts sufficient to provide preferably up to about 0.95 equivalent, more preferably from about 0.05 to about 0.95 equivalents of ammonia and/or amine per equivalent of the acid or anhydride. For purposes of this invention an equivalent of amine is that amount of the amine corresponding to the total weight of amine divided by the total number of nitrogens present. Thus, octylamine has an equivalent weight equal to its molecular weight; ethylene diamine has an equivalent weight equal to one-half its molecular weight; and aminoethylpiperazine has an equivalent weight equal to one-third its molecular weight. Also, for example, the equivalent weight of a commercially available mixture of polyalkylene polyamine can be determined by dividing the atomic weight of nitrogen (14) by the % N contained in the polyamine. Thus, a polyamine mixture having a % N of 34 would have an equivalent weight of 41.2. An equivalent weight of ammonia is its molecular weight. An equivalent of the acid or anhydride is the same as discussed above with respect to reaction with alcohols.

Hydroxyamines Useful in Making Ester and/or Amide Derivatives (A)(i), (B)(i)(a), (B)(ii)(a), (C)(i)(a) and (C)(ii)(a):

Hydroxyamines, both mono- and polyamines, can be used in forming amide and/or ester derivatives (A)(i), (B)(i)(a), (B)(ii)(a), (C)(i)(a) and (C)(ii)(a). Hydroxy-substituted amines having primary and/or secondary amino groups are useful in making amide derivatives. Hydroxy-substituted amines having only tertiary nitrogens are useful in making ester derivatives. The terms hydroxyamine, hydroxy-substituted amine and aminoalcohol describe the same class of compounds and are thus interchangeable.

The hydroxyamines can be primary, secondary, or tertiary amines. Typically, the hydroxyamines are primary, secondary or tertiary alkanol amines or mixtures thereof. Such amines can be represented, respectfully, by the formulae:

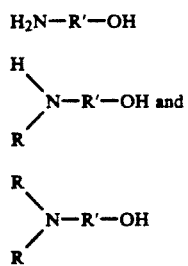

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group -R'-OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms.

The hydroxyamines can also be an ether N-(hydroxy-substituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

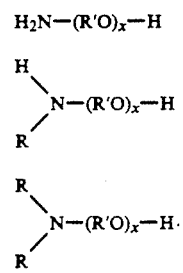

wherein x is a number from about 2 to about 15 and R and R' are as described above.

Polyamine analogs of these hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N'-di(hydroxyl ethyl) piperazine, and the like.

Useful hydroxyamines include the hydroxy-substituted primary amines described in U.S. Pat. No. 3,576,743 by the general formula

$$R_a\text{—}NH_2$$

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a\text{—}NH_2$ wherein $R_a$ is a mono- or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris-(hydroxymethyl) amino methane (also known as trismethylolamino methane), 2-amino-1-butanol, ethanolamine, beta-(beta-hydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxyethoxy-ethyl)-ethylenediamine, trismethylolaminomethane and the like. U.S. Pat. No. 3,576,743 is incorporated herein by reference.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The carboxylic acid or anhydride can be reacted with a hydroxyamine according to conventional ester- and/or amide-forming techniques. This normally involves heating the acid or anhydride with the hydroxyamine, optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., preferably about 80° C. to about 100° C. when the carboxylic reactant is an anhydride. On the other hand, when the carboxylic reactant is an acid, this temperature is preferably in the range of about 100° C. up to about 300° C. with temperatures in the range of about 125° C. to about 250° C. often being employed. Usually, up to about 0.95 equivalent, preferably from about 0.05 to about 0.95 equivalent, more preferably about 0.5 equivalent of hydroxyamine are used for each equivalent of acid or anhydride. For purposes of this reaction, an equivalent of a hydroxyamine is its molecular weight by the total number of —OH, >NH and —$NH_2$ groups present in the molecule. Thus, diethylethanolamine has an equivalent weight equal to its molecular weight; ethanolamine has an equivalent weight equal to one-half its molecular weight. An equivalent of acid or anhydride is the same as discussed above with respect to reaction with alcohols.

Components (A)(ii), (B)(i)(b) and (B)(ii)(b):

Components (A)(ii), (B)(i)(b) and (B)(ii)(b) include ammonia and all of the primary and secondary amines discussed above as being useful in preparing the amide derivatives (A)(i), (B)(i)(a), (B)(ii)(a), (C)(i)(a) and (C)(ii)(a), and the hydroxyamines discussed above as being useful in preparing the amide and/or ester derivatives (A)(i), (B)(i)(a), (B)(ii)(a), (C)(i)(a) and (C)(ii)(a). In addition to ammonia and the amines and hydroxyamines discussed above, the amines (A)(ii), (B)(i)(b) and (B)(ii)(b) also include tertiary amines. The tertiary amines are analogous to the primary and secondary amines and hydroxyamines discussed above with the exception that hydrogen atoms in the H—N< or —$NH_2$ groups are replaced by hydrocarbyl groups. These tertiary amines can be monoamines or polyamines. The monoamines are represented by the formula

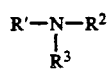

$$R'\text{—}\underset{\underset{R^3}{|}}{N}\text{—}R^2$$

wherein R', $R^2$ and $R^3$ are the same or different hydrocarbyl groups. Preferably, R', $R^2$ and $R^3$ are independently hydrocarbyl groups of from 1 to about 20 carbon atoms. The tertiary amines can be symmetrical amines, dimethylalkyl amines or those derived from the reaction of a primary amine or a secondary amine with ethylene oxide. The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation (i.e., —C≡C—). The tertiary amines may also contain non-hydrocarbon substituents or groups as long as these groups do not significantly interfere with the reaction of the amines with the carboxylic acids and derivatives thereof of this invention. Such non-hydrocarbon substituents or groups include lower alkoxy, lower alkyl, mercapto, nitro, and interrupting groups such as —O— and —S— (e.g., as in such groups as —CH$_2$CH$_2$—X— CH$_2$CH$_2$— where X is —O— or —S—). Examples of such tertiary amines include trimethyl amine, triethyl amine, tripropyl amine, tributyl amine, monomethyldiethyl amine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyldicodanyl amine, dimethylphenyl amine, N,N-dioctyl-1-octanamine, N,N-didodecyl-1-dodecanamine tricoco amine, trihydrogenated-tallow amine, N-methyldihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcocoamine, N,N-dimethylsoyaamine, N,N-dimethyl hydrogenated tallow amine, etc.

The alkali and alkaline earth metals that are useful as components (A)(ii), (B)(i)(b) and (B)(ii)(b) can be any alkali or alkaline earth metal. The alkali metals are preferred. Sodium and potassium are particularly preferred. Suitable metal bases include the free metals as well as reactive compounds of such metals. The reactive compounds include nitrates, nitrites, halides, carboxylates, phosphates, phosphites, sulfates, sulfites, carbonates, oxides, hydroxides, acetates, etc. Examples of such reactive compounds include sodium oxide, sodium hydroxide, sodium carbonate, sodium methylate, sodium propylate, sodium pentylate, sodium phenoxide, potassium oxide, potassium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium caronate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium iodide, magnesium phenoxide, etc. The above metal compounds are merely illustrative of those useful in this invention and the invention is not to be considered as limited to such.

Reaction Between Components (A)(i), (B)(i)(a) and (B)(ii)(a) and Corresponding Components (A)(ii), (B)(i)(b) and (B)(ii)(b):

The carboxylic acid or anhydride, or ester or amide derivative (A)(i), (B)(i)(a) and (B)(ii)(a), and corresponding component (A)(ii), (B)(i)(b) and (B)(ii)(b) can be reacted together at a temperature ranging from about 30° C. to the decomposition temperature of the reaction components and/or products having the lowest such temperature. Preferably the reaction is carried out under salt-forming conditions using conventional techniques and the product thus formed comprises a salt moiety. Typically, the reactants are mixed together and heated to a temperature in the range of about 50° C. to about 130° C., more preferably about 80° C. to about 110° C.; optionally, in the presence of a normally liquid, substantially inert organic liquid solvent/diluent, until the desired product has formed. The ratio of reactants may be varied over a wide range. Generally, from about 0.1 to about 2 equivalents or more, preferably about 0.5 to about 1.5 equivalents of components (A)(ii), (B)(i)(b) and (B)(ii)(b) are used for each equivalent of the corresponding component (A)(i), (B)(i)(a) or (B)(ii)(a).

For purposes of this reaction, an equivalent of component (A)(i), (B)(i)(a) or (B)(ii)(a) in the acid or anhydride form is the same as discussed above with respect to the reaction of the acids and anhydrides with alcohols. The number of equivalents of component (A)(i), (B)(i)(a) and (B)(ii)(a) in the ester and/or amide derivative form, depends on the total number of carboxy groups present that are capable of reacting as carboxylic acid acylating agents with the corresponding component (A)(ii), (B)(i)(b) or (B)(ii)(b); for example, the number of carboxy groups in (A)(i), (B)(i)(a) or (B)(ii)(a) that are capable of forming a carboxylic salt with the corresponding components (A)(ii), (B)(i)(b) and (B)(ii)(b). Thus, there would be one equivalent in an acid/amide derived from one mole of a polyisobutylene-substituted succinic anhydride and one mole of ammonia. Similarly, there would be one equivalent in an acid/ester derived from one mole of a polyisobutylene-substituted succinic anhydride and methanol. When components (A)(ii), (B)(i)(b) and (B)(ii)(b) are amines, an equivalent thereof is its molecular weight divided by the total number of nitrogens present in the molecule that are sufficiently basic to react with the corresponding component (A)(i), (B)(i)(a) and (B)(ii)(a). These include, for example, the nitrogen atoms of primary aliphatic amines, secondary aliphatic amines and tertiary aliphatic amines as well as amines bearing one aryl group on the nitrogen atom (e.g., aniline). On the other hand, these do not include, for example, amides, (i.e., $$-\overset{O}{\underset{\|}{C}}-NH_2)\ \text{or}$$

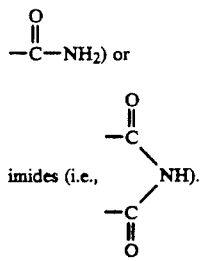

imides (i.e., ).

Thus, octylamine has an equivalent weight equal to its molecular weight; ethylene diamine has an equivalent weight equal to one-half of its molecular weight; both ethanolamine and diethylethanolamine have equivalent weights equal to their molecular weights. The equivalent weight of a commercially available mixture of polyalkylene polyamines can be determined by dividing the atomic weight of nitrogen (14) by the % N contained in the polyamine; thus, a polyalkylene polyamine mixture having a % N of 34 would have an equivalent weight of 41.2. When component (A)(ii), (B)(i)(b) or (B)(ii)(b) is ammonia, an equivalent weight thereof is its molecular weight. When component (A)(ii), (B)(i)(b) or (B)(ii)(b)

is an alkali or alkaline earth metal, an equivalent weight thereof is its atomic weight divided by its valence.

In one embodiment of the invention, the product of the reaction between components (A)(i), (B)(i)(a) or (B)(ii)(a) and corresponding components (A)(ii), (B)(i)(b) or (B)(ii)(b) comprises a carboxylic salt moiety. Thus, this product is typically constituted of compositions containing at least one compound having at least one carboxylic salt linkage (i.e.,

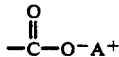

wherein A+ is a metal, ammonium or amine cation) within its molecular structure. This product can also include other compounds such as amides, esters, and the like. Preferably, these products contain compounds containing salt linkages in at least about 15% on a molar basis of the carboxyl groups in such products, more preferably at least about 20%, more preferably at least about 35%, more preferably at least about 50%, more preferably at least about 75%, more preferably at least about 90%.

Components (C)(i)(b) and (C)(ii)(b):

Components (C)(i)(b) and (C)(ii)(b) can be the same or different, but preferably are the same. Components (C)(i)(b) and (C)(ii)(b) can be ammonia, or any of the amines or hydroxyamines discussed above as being useful in making the derivatives (A)(i), (B)(i)(a), (B)(ii)(a), (C)(i)(a) and (C)(ii)(a), or as being components (A)(ii), (B)(i)(b) or (B)(ii)(b). In addition to ammonia, and such amines and hydroxyamines, components (C)(i)(b) and (C)(ii)(b) can be any of the alkali or alkaline-earth metals or compounds thereof discussed above as being useful as components (A)(ii), (B)(i)(b) and (B)(ii)(b).

Component (C)(iii):

Component (C)(iii) can be any compound having (a) two or more primary amino groups, (b) two or more secondary amino groups, (c) at least one primary amino group and at least one secondary amino group, (d) at least two hydroxyl groups, or (e) at least one primary or secondary amino group and at least one hydroxyl group. These include polyamines, polyols and hydroxyamines.

(1) Polyamines Useful as Component (C)(iii):

The polyamines useful as component (C)(iii) are characterized by the presence within their structure of at least two —NH₂ groups, at least two >NH groups, or at least one —NH₂ group and at least one >NH group. The polyamines discussed above as being useful in making the amide derivatives (A)(i), (B)(i)(a), (B)(ii)(a), (C)(i)(a) and (C)(ii)(a), or the polyamines discussed above as being useful as components (A)(ii), (B)(i)(b) and (B)(ii)(b) that have the required number of —NH₂ and/or >NH groups can be used as component (C)(iii).

These polyamines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. These amines may also contain non-hydrocarbon substituents or groups as long as these groups do not interfere with the reaction of such amines with reactants (C)(i) and (C)(ii). Such non-hydrocarbon substituents or groups include lower alkoxy, lower alkyl, mercapto, nitro, and interrupting groups such as —O— and —S— (e.g., as in such groups as

—CH₂CH₂—X—CH₂CH₂— where X is —O— or —S—).

Useful polyamines are the alkylene polyamines. These alkylene polyamines can be represented by the formula:

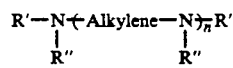

wherein n is from 1 to about 10, preferably from 1 to about 7; each R' and R" is independently a hydrogen atom, a hydrocarbyl group or a hydroxy-substituted hydrocarbyl group having up to about 700 carbon atoms, preferably up to about 100 carbon atoms, more preferably up to about 50 carbon atoms, more preferably up to about 30 carbon atoms, with the proviso that at least one of R' and at least one of R" are hydrogen; and the "Alkylene" group has from about 1 to about 10 carbon atoms, preferably from 1 to about 4 carbon atoms, with the preferred Alkylene being ethylene or propylene. Useful alkylene polyamines are those wherein each R' and each R" are hydrogen with the ethylene polyamines, and mixtures of ethylene polyamines being particularly preferred. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

(2) Polyols Useful as Component (C)(iii):

The polyols useful as component (C)(iii) include the alcohols or polyhydric alcohols with two or more hydroxyl groups discussed above as being useful in making the ester derivatives (A)(i), (B)(i)(a), (B)(ii)(a), (C)(i)(a) and (C)(ii)(a). These alcohols include polyols of the general formula:

R₁(OH)ₘ wherein R₁ is a monovalent or polyvalent organic group joined to the —OH groups through carbon-to-oxygen bonds (that is, —COH wherein the carbon is not part of a carbonyl group) and m is an integer of from 2 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the polyhydric alcohols corresponding to the formula R₁(OH)ₘ preferably contain not more than about 40 carbon atoms, more preferably not more than about 20 carbon atoms. The alkylene glycols containing from 1 to about 20 carbon atoms, preferably 1 to about 10 carbon atoms, more preferably 1 to about 6 carbon atoms, more preferably 1 to about 4 carbon atoms, and especially ethylene glycol, are useful. The alcohols may contain non-hydrocarbon substituents or groups which do not interfere with the reaction of such alcohols with reactants (C)(i) and (C)(ii). Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$ where X is —O— or —S—).

The polyhydric alcohols include polyhydroxy aromatic compounds. Polyhydric phenols and naphthols are useful hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 2 to about 4 hydroxy groups. The aromatic hydroxy compounds are illustrated by the following specific examples: resorcinol, catechol, p,p'-dihydroxy-biphenyl, hydroquinone, pyrogallol, phloroglucinol, hexylresorcinol, orcinol, etc.

(3) Hydroxyamines Useful as Component (C)(iii):

The hydroxyamines can be primary or secondary amines. They can also be tertiary amines provided said tertiary amines also contain at least two hydroxyl groups. These hydroxyamines contain at least two >NH groups, at least two —NH$_2$ groups, at least one —OH group and at least one >NH or —NH$_2$ group, or at least two —OH groups. The hydroxyamines having the foregoing characteristics that are discussed above as being useful in making the amide and/or ester derivatives (A)(i), (B)(i)(a), (B)(ii)(a), (C)(i)(a) or (C)(ii)(a), or as component (A)(ii), (B)(i)(b) or (B)(ii)(b) can be used as component (C)(iii).

The hydroxyamines include (a') N-(hydroxyl-substituted hydrocarbyl) primary or secondary amines, (b') hydroxyl-substituted poly(hydrocarbyloxy) analogs of (a'), or (c') mixtures of (a') and (b'). These hydroxyamines include primary or secondary alkanol amines containing up to about 40 carbon atoms, preferably up to about 20 carbon atoms, more preferably up to about 10 carbon atoms. Useful hydroxyamines include the primary and secondary alkanol amines represented, respectfully, by the formulae:

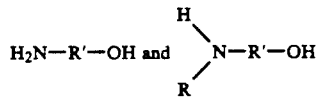

wherein R is a hydrocarbyl group of 1 to about 8 carbon atoms or hydroxyl-substituted hydrocarbyl group of 2 to about 8 carbon atoms and R' is a divalent hydrocarbyl group of about 2 to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Typically, R is a lower alkyl group of up to seven carbon atoms.

The hydroxyamines can also be ether N-(hydroxy-substituted hydrocarbyl)amines. These are hydroxyl-substituted poly(hydrocarbyloxy) analogs of the above-described primary and secondary alkanol amines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

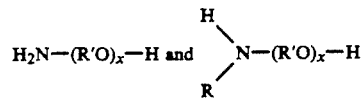

wherein x is a number from about 2 to about 15 and R and R' are as described above.

Reaction of Components (C)(i) and (C)(ii) with Component (C)(iii) to Form Component (C):

Components (C)(i)(a) and (C)(ii)(a) can be reacted with component (C)(iii) to form an intermediate. The intermediate is then reacted with components (C)(i)(b) and (C)(ii)(b) to form component (C). An alternative method of preparing component (C) involves reacting components (C)(i)(a) and (C)(i)(b) with each other to form a first intermediate, separately reacting components (C)(ii)(a) and (C)(ii)(b) with each other to form a second intermediate, then reacting a mixture of these two intermediates with component (C)(iii) to form component (C).

The ratio of reactants utilized in the preparation of component (C) may be varied over a wide range. Generally, for each equivalent of each of components agents (C)(i)(a) and (C)(ii)(a), at least about one equivalent of component (C)(iii) is used. From about 0.1 to about 2 equivalents or more of components (C)(ii)(a) and (C)(ii)(b) are used for each equivalent of components (C)(i)(a) and (C)(ii)(a), respectively. The upper limit of component (C)(iii) is about 2 equivalents of component (C)(iii) for each equivalent of component (C)(i)(a), and about two equivalents of component (C)(iii) for each equivalent of component (C)(ii)(a). Generally the ratio of equivalents of components (C)(i)(a) to (C)(ii)(a) is about 0.5 to about 2, with about 1:1 being preferred. Preferred amounts of the reactants are about 2 equivalents of the component (C)(iii) and from about 0.1 to about 2 equivalents of each of components (C)(i)(b) and (C)(ii)(b) for each equivalent of each of components (C)(i)(a) and (C)(ii)(a).

The number of equivalents of components (C)(i)(a) and (C)(ii)(a) depends on the total number of carboxylic functions present in each. In determining the number of equivalents for each of the components (C)(i)(a) and (C)(ii)(a), those carboxyl functions which are not capable of reacting as a carboxylic acid acylating agent are excluded. In general, however, there is one equivalent of component (C)(i)(a) and (C)(ii)(a) for each carboxy group. For example, there would be two equivalents in an anhydride derived from the reaction of one mole of olefin polymer and one mole of maleic anhydride.

An equivalent weight of a polyamine is the molecular weight of the polyamine divided by the total number of nitrogens present in the molecule. If the polyamine is to be used as component (C)(iii), tertiary amino groups are not counted. On the other hand, if the polyamine is to be used as component (C)(i)(b) or (C)(ii)(b), tertiary amino groups are counted. Thus, ethylene diamine has an equivalent weight equal to one-half of its molecular weight; diethylene triamine has an equivalent weight equal to one-third its molecular weight. The equivalent weight of a commercially available mixture of polyalkylene polyamine can be determined by dividing the atomic weight of nitrogen (14) by the % N contained in the polyamine; thus, a polyamine mixture having a % N of 34 would have an equivalent weight of 41.2. An equivalent weight of ammonia or a monoamine is its molecular weight.

An equivalent weight of polyhydric alcohol is its molecular weight divided by the total number of hydroxyl groups present in the molecule. Thus, an equivalent weight of ethylene glycol is one-half its molecular weight.

An equivalent weight of a hydroxyamine which is to be used as component (C)(iii) is its molecular weight divided by the total number of —OH, >NH and —NH$_2$ groups present in the molecule. Thus, dimethylethanolamine when used as component (C)(iii) has an equivalent weight equal to its molecular weight; ethanolamine has an equivalent weight equal to one-half its molecular weight. On the other hand, if the hydroxyamine is to be used as components (C)(i)(b) or (C)(ii)(b), an equivalent weight thereof would be its molecular weight divided by the total number of nitrogen groups present in the molecule. Thus, dimethylethanolamine, when used as component (C)(i)(b) or (C)(ii)(b), would have an equivalent weight equal to its molecular weight; ethanolamine would also have an equivalent weight equal to its molecular weight.

An equivalent weight of an alkali or alkaline earth metal is its atomic weight divided by its valence.

Components (C)(i)(a) and (C)(ii)(a) can be reacted with component (C)(iii) according to conventional ester- and/or amide-forming techniques. This normally involves heating components (C)(i)(a) and (C)(ii)(a) with component (C)(iii), optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., more preferably about 80° C. to about 100° C. when components (C)(i)(a) and (C)(ii)(a) are anhydrides. On the other hand, when components (C)(i)(a) and (C)(ii)(a) are acids, this temperature is preferably in the range of about 100° C. to about 300° C. with temperatures in the range of about 125° C. to about 250° C. often being employed.

The reactions between components (C)(i)(a) and (C)(ii)(a), and (C)(i)(b) and (C)(ii)(b) are preferably carried out under salt forming conditions using conventional techniques. Typically, components (C)(i)(a) and (C)(ii)(a), and (C)(i)(b) and (C)(ii)(b) are mixed together and heated to a temperature in the range of about 20° C. up to the decomposition temperature of the reaction component and/or product having the lowest such temperature, preferably about 50° C. to about 130° C., more preferably about 80° C. to about 110° C.; optionally, in the presence of a normally liquid, substantially inert organic liquid solvent/diluent, until the desired product has formed.

The product of the reaction between components (C)(i)(a) and (C)(ii)(a), and (C)(i)(b) and (C)(ii)(b), respectively, preferably contain at least some salt linkage. Preferably at least about 10% on a molar basis, more preferably at least about 30%, more preferably at least about 50%, more preferably at least about 70%, and advantageously up to about 100% of the carboxyl groups in components (C)(ii)(a) and (C)(ii)(b) that react with components (C)(i)(a) and (C)(i)(b), respectively, form a salt linkage.

Component (II):

The phosphorus-containing acids (II)(A') are represented by the formula

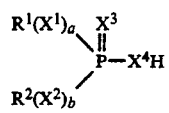

wherein $X^1$, $X^2$, $X^3$ and $X^4$ are independently oxygen or sulfur; a and b are independently zero or one, and $R^1$ and $R^2$ are independently hydrocarbyl groups. Illustrative examples of useful phosphorus-containing acids include:

1. Dihydrocarbyl phosphinodithioic acids corresponding to the formula

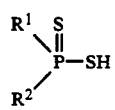

2. S-hydrocarbyl hydrocarbyl phosphonotrithioic acids corresponding to the formula

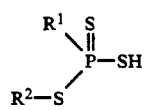

3. O-hydrocarbyl hydrocarbyl phosphonodithioic acids corresponding to the formula

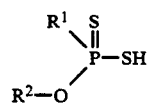

4. S,S'-dihydrocarbyl phosphorotetrathioic acids corresponding to the formula

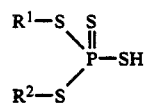

5. O,S-dihydrocarbyl phosphorotrithioic acids corresponding to the formula

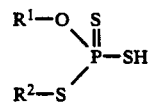

6. O,O'-dihydrocarbyl phosphorodithioic acids corresponding to the formula

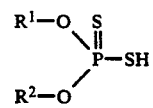

Preferred acids of the formula

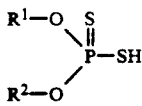

are readily obtainable by the reaction of phosphorus pentasulfide (P$_2$S$_5$) and an alcohol or a phenol. The reaction involves mixing at a temperature of about 20° C. to about 200° C., four moles of alcohol or a phenol with one mole of phosphorus pentasulfide. Hydrogen sulfide is liberated in this reaction. The oxygen-containing analogs of these acids are conveniently prepared by treating the dithioic acid with water or steam which, in effect, replaces one or both of the sulfur atoms.

Preferred phosphorus-containing acids (II)(A') are phosphorus- and sulfur-containing acids. These preferred acids preferably include those acids wherein at least one $X^3$ or $X^4$ is sulfur, and more preferably both $X^3$ and $X^4$ are sulfur, at least one $X^1$ or $X^2$ is oxygen, more preferably both $X^1$ and $X^2$ are oxygen, and a and b are each 1. Mixtures of these acids may be employed in accordance with this invention.

$R^1$ and $R^2$ are independently hydrocarbyl groups that are preferably free from acetylenic unsaturation and usually also free from ethylenic unsaturation and preferably have from about 1 to about 50 carbon atoms, more preferably from about 1 to about 30 carbon atoms, more preferably from about 3 to about 18 carbon atoms, more preferably from about 4 to about 12 carbon atoms, more preferably from about 4 to about 8 carbon atoms. Each $R^1$ and $R^2$ can be the same as the other, although they may be different and either or both may be mixtures. Examples of preferred $R^1$ and $R^2$ groups include t-butyl, isobutyl, amyl, isooctyl, decyl, dodecyl, eicosyl, 2-pentenyl, dodecenyl, phenyl, naphthyl, alkylphenyl, alkylnaphthyl, phenylalkyl, naphthylalkyl, alkylphenylalkyl, alkylnaphthylalkyl, and the like.

The metals that are useful in making the salts (II)(B') are those that form salts with the phosphorus-containing acids (II)(A'), and form metal-containing complexes when the salts (II)(B') are reacted with component (I). These metals include magnesium, calcium, strontium, chromium, manganese, iron, molybdenum, cobalt, nickel, copper, silver, zinc, cadmium, aluminum, tin, lead, or a mixture of two or more thereof. Calcium, zinc, cadmium, copper, nickel or a mixture of two or more thereof are preferred. Zinc and copper are more preferred. Zinc is more preferred.

Suitable metal bases for the preparations of the metal salts (II)(B') include the free metals previously enumerated and their nitrates, nitrites, halides, carboxylates, phosphates, phosphites, sulfates, sulfites, carbonates, oxides, hydroxides, acetates, etc. Examples include magnesium oxide, magnesium hydroxide, calcium hydroxide, calcium acetate, lead oxide, cobaltous nitrate, cobaltous oxide, cobaltic oxide, cobaltic nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite; cupric oxychloride, cupric palmitate, cupric salicylate, zinc acetate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroacetate, cadmium fumerate, cadmium nitrate, cadmium di-hydrogenphosphate, cadmium sulfite, cadmium oxide, etc. Hydrates of the above compounds are useful.

The metal salts (II)(B') can be acidic, neutral or overbased. The term "neutral salt" refers to salts characterized by metal content equal to that which would be present according to the stoichiometry of the metal and the phosphorus-containing acid (II)(A') reacted with the metal. Thus, if a phosphorodithioic acid,

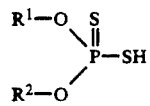

is neutralized with a basic metal compound, e.g., zinc oxide, the neutral metal salt produced would contain one equivalent of zinc for each equivalent of acid, i.e.,

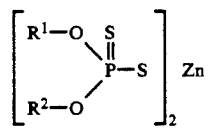

For purposes of this reaction, an equivalent weight of phosphorus-containing acid (II)(A') is its molecular weight divided by the number of -PXXH groups therein. The equivalent of a metal for this purpose is its atomic weight divided by its valence. With the present invention, component (II)(B') can contain more or less than the stoichiometric amount of metal. The products containing less than the stoichiometric amount of metal are acidic materials. The products containing more than the stoichiometric amount of metal are overbased materials. For example, salts of component (II)(B') containing 50% of the metal present in the corresponding neutral salt are acidic, while salts of component (II)(B') containing 200% of the metal present in the corresponding neutral salt are overbased. Component (II)(B') has up to about 200%, preferably about 50% to about 200%, more preferably about 80% to about 150%, more preferably about 90% to about 135%, more preferably about 90% to about 110% of the metal present in the corresponding neutral salt.

The temperature at which the salts (II)(B') are prepared is generally between about 30° C. and about 150° C., preferably between about 30° C. and about 125° C. It is preferred to employ temperatures in the range of about 50° C. to about 125° C., more preferably about 75°

C. to about 125° C. The pressure is preferably atmospheric pressure. The reaction can be conducted in the presence of a substantially inert, normally liquid organic diluent such as naphtha, benzene, xylene, mineral oil or the like.

Reaction Between Components (I) and (II):

The inventive compositions are prepared by reacting component (I) with component (II). Component (I) can be prepared separately and then later reacted with component (II), or component (I) can be initially prepared and then immediately or shortly thereafter reacted with component (II) in the same reaction vessel.

To prepare the inventive compositions, one or more of component (I) and one or more of component (II) are mixed together, optionally in the presence of a normally liquid substantially inert organic solvent/diluent at a temperature in the range of about 30° C. up to the decomposition temperature of the reaction components and/or products having the lowest such temperature. Preferably, the reactants are mixed together and heated to a temperature in the range of about 30° C. to about 100° C., more preferably about 60° C. to about 95° C., more preferably about 70° C. to about 90° C., more preferably about 75° C. to about 85° C., until the desired product is formed. In one embodiment, the reactants are mixed and heated for about 15 minutes to about 5 hours, preferably about 1 to about 3 hours. The weight ratio of component (I) to component (II) is preferably from about 95:5 to about 50:50, more preferably about 95:5 to about 70:30, more preferably about 95:5 to about 80:20, more preferably about 95:5 to about 85:15.

In one embodiment of the invention, component (II) is (II)(B') and the reaction product formed by the reaction of component (I) with component (II)(B') is a metal-containing complex. While not wishing to be bound by theory, it is believed that in the formation of such complexes the nitrogen in component (I) complexes with the metal in component (II).

Examples 1-19 are illustrative of the preparation of component (I) of the invention. Examples 20-33 are illustrative of the preparation of the inventive compositions derived from components (I) and (II). Unless otherwise indicated, in the following examples as well as throughout the entire specification and in the appended claims, all parts and percentages are by weight, all temperatures are in degrees centigrade, and all pressures are atmospheric.

EXAMPLE 1

2240 parts of polyisobutenyl (number average molecular weight of about 950 and weight average molecular weight of about 2100) substituted succinic anhydride are heated to a temperature of about 90° C. 468 parts of diethylethanolamine are added over a 2-hour period. The mixture is heated for an additional hour at 90° to provide the desired product.

EXAMPLE 2

1120 parts of the polyisobutenyl-substituted succinic anhydride used in Example 1 and 325 parts of a hydrocarbyl-substituted succinic anhydride derived from one mole of a $C_{16}$ alpha-olefin and one mole of maleic anhydride are heated to a temperature of 93° C. with stirring and maintained at that temperature for one hour. 62 parts of ethylene glycol are added to the mixture. The mixture is maintained at a temperature of 93-105° C. for 2 hours. 178 parts of dimethylethanolamine are added to the mixture over a period of 0.5 hour. The mixture is maintained at 93-104° C. for 2.5 hours then cooled to 70° C. to provide the desired product.

EXAMPLE 3

2228 parts of polyisobutenyl-substituted succinic anhydride used in Example 1 are heated to 90° C. with stirring. 178 parts of dimethylethanolamine are added over a period of one hour while maintaining the temperature at 90-97° C. The mixture is maintained at 90-97° C. for an additional 0.5 hour to provide the desired product.

EXAMPLE 4

1600 parts of hydrocarbyl-substituted succinic anhydride derived from a $C_{16}$ alpha-olefin and maleic anhydride are heated to 80-90° C. 445 parts of dimethylethanolamine are added over a period of one hour while maintaining the temperature at 85-95° C. The mixture is maintained at 85-95° C. for an additional one hour, and then cooled to 60° C. to provide the desired product.

EXAMPLE 5

2240 parts of the polyisobutenyl-substituted succinic anhydride used in Example 1 are heated to a temperature in the range of 110-116° C. 174 parts of morpholine are then added dropwise to the anhydride. After completion of the addition of morpholine, the resulting mixture is maintained at a temperature of 116-126° C. for two hours. 234 parts of diethylethanolamine are then added dropwise while the temperature is maintained at 116-126° C. After completion of the addition of diethylethanolamine, the resulting mixture is maintained at 116-126° C. for 50 minutes with stirring.

EXAMPLE 6

A mixture of 1100 parts of the polyisobutenyl-substituted succinic anhydride used in Example 1 and 100 parts of Carbowax 200 (a product of Union Carbide identified as a polyethylene glycol having a molecular weight of 200) are heated to a temperature of 123-134° C., maintained at said temperature for 2 hours, then cooled to 100° C. 117 parts of diethylethanolamine are added to the resulting product over a 0.2 hour period while maintaining the temperature at 100° C. The mixture is then cooled to room temperature.

EXAMPLE 7

A mixture of 1100 parts of the polyisobutenyl-substituted succinic anhydride used in Example 1 and 34 parts of pentaerythritol are heated to a temperature of 125-160° C., maintained at said temperature for 4 hours, then adjusted to 130° C. 117 parts of diethylethanolamine are added to the mixture. The temperature is maintained at 100-130° C. for 1 hour. The resulting product is then cooled to room temperature.

EXAMPLE 8

A mixture of 2240 parts of the polyisobutenyl-substituted succinic anhydride used in Example 1 and 300 parts of a 40 SUS mineral seal oil are heated to 50° C. with continuous stirring over a 0.5-hour period. 54 parts of tap water are added and the resulting mixture is heated from 50° C. to 92° C. over a 0.5-hour period, then maintained at 92-98° C. for 5 hours. 244 parts of monoethanolamine are added and the resulting mixture is maintained at 92-98° C., then cooled to room temperature.

EXAMPLE 9

A mixture of 2240 parts of the polyisobutenyl-substituted succinic anhydride used in Example 1 and 62 parts of ethylene glycol are heated to a temperature in the range of 116-120° C., then maintained at said temperature for 5 hours. The temperature of the mixture is then increased to a temperature in the range of 138-146° C. and maintained at said increased temperature for an additional 4.5 hours. The temperature of the mixture is then decreased to 115° C. over a period of 0.5 hour. 122 parts of monoethanolamine are added to the mixture over a period of 0.5 hour while maintaining the temperature at 115-120° C. The mixture is then stirred for an additional 0.5 hour while maintaining the temperature at 115-120° C., then cooled to room temperature.

EXAMPLE 10

2895 parts of polyisobutenyl (number average molecular weight of 1700) substituted succinic anhydride are heated to 121° C. over a 1-hour period. 605 parts of diethylethanolamine are added over a 2-hour period while maintaining the temperature of the mixture at 121-128° C. The mixture is maintained at 121-123° C. for an additional hour, and then cooled to 50° C. to provide the desired product.

EXAMPLE 11

A mixture of 1000 parts of the polyisobutenyl-substituted succinic anhydride used in Example 1 and 337 parts of a blend oil are heated to 85° C. 26 parts of tap water are added to the mixture. The mixture is heated to 102° C. over a period of 0.25 hour. The mixture is maintained at a temperature of 102-105° C. for 4 hours, and then cooled to 70° C. 209 parts of diethylethanolamine are added to the mixture over a 0.2-hour period, and the mixture exotherms to 79° C. The mixture is then maintained at a temperature of 78-79° C. for 1.5 hours and then cooled to room temperature to provide the desired product.

EXAMPLE 12

1120 parts of the polyisobutenyl-substituted succinic anhydride used in Example 1 are heated to 85-90° C. over a 1-hour period. 117 parts of diethylethanolamine are added over a 0.5-hour period. The resulting mixture is maintained at a temperature of 85-90° C. for 4 hours, then cooled to room temperature to provide the desired product.

EXAMPLE 13

A mixture of 917 parts of diluent oil, 40 parts of diatomaceous earth filter aid, 10 parts of caustic soda, 0.2 part of a silicone-based anti-foam agent, 135 parts of 3-amino-1,2,4-triazole, and 6.67 parts of a commercial polyethylene polyamine mixture containing 33.5% nitrogen and substantially corresponding to tetraethylene pentamine are heated to a temperature of 121° C. with stirring. 1000 parts of the polysiobutylenyl-substituted succinic anhydride used in Example 1 are slowly added to the mixture over a period of about one hour, and during such addition the temperature of the mixture is increased from 121° C. to 154° C. The mixture is then maintained at a temperature of 154-160° C. with nitrogen blowing for 12 hours. The mixture is then cooled to 138-149° C. and filtered. A final oil adjustment is made to adjust the product to a 45% by weight diluent oil.

EXAMPLE 14

6720 parts of the polyisobutenyl succinic anhydride used in Example 1 are heated to 90° C. with stirring. 702 parts of diethylethanolamine are added over a 1.5-hour period. This intermediate mixture is then heated for an additional 0.5 hour at 90° C. Then 366 parts of monoethanolamine are slowly added. The mixture is maintained at 90° C. for 0.5 hour and then cooled to provide the desired product.

EXAMPLE 15

A mixture of 2644 parts of the polyisobutenyl succinic anhydride used in Example 1 and 75 parts of ethylene glycol are heated to a temperature of 120° C., and maintained at said temperature for 4 hours. The temperature of the mixture is then increased to 160-170° C., maintained at said temperature for 2 hours, then reduced to 120° C. 281 parts of diethylethanolamine are added to the mixture over a 0.25 hour period. The temperature of the mixture is maintained at 115-120° C. for 1 hour. The mixture is then cooled to room temperature to provide the desired product.

EXAMPLE 16

A mixture of 2240 parts of the polyisobutylene-substituted succinic anhydride used in Example 1 and 86 parts of piperazine are heated to a temperature of 116-126° C. and maintained at said temperature for 2 hours. 234 parts of diethylethanolamine are added dropwise to the mixture. The temperature is maintained at 116-126° C. for 50 minutes. The resulting product is then cooled to room temperature.

EXAMPLE 17

One mole of the polyisobutenyl-substituted succinic anhydride used in Example 1 and one mole of piperidene are heated at a temperature of 105-120° C. for 3 hours to provide the desired product.

EXAMPLE 18

One mole of the polyisobutenyl-substituted succinic anhydride used in Example 1 and two moles of morpholine are heated at a temperature of 94-105° C. for 2.5 hours to provide the desired product.

EXAMPLE 19

One mole of the polyisobutenyl-substituted succinic anhydride used in Example 1 and two moles of ethanolamine are heated at a temperature of 85-95° C. for 1 hour to provide the desired product.

EXAMPLE 20

4800 parts of the product from Example 1, and 2640 parts of 40N oil are heated to 80° C. with continuous stirring. 536 parts of neutral zinc salt of O,O'-di(isooctyl) phosphorodithioic acid are added to the mixture. The mixture is heated at 80-84° C. for 1 hour. 24 parts of water are added to the mixture and blended for 20 minutes to provide the desired product. Infrared analysis indicates the formation of a complex. This is shown by a shift in the P=S absorption in the IR from 660 $cm^{-1}$ to 670-680 $cm^{-1}$ with the reaction product.

EXAMPLE 21

989.2 parts of the polyisobutenyl-substituted succinic anhydride used in Example 1 and 663.4 parts of 40N oil are heated to 90-95° C. with continuous stirring. 208.0 parts of diethylethanolamine are added over a 2-hour period with continuous stirring while maintaining the temperature at 90–95° C. The resulting mixture is heated for an additional 4.5 hours at 90–95° C. 133.4 parts of neutral zinc salt of O,O'-di(isooctyl) phosphorodithioic acid are added over 0.5 hour while maintaining the mixture at 90–95° C. 6.0 parts of water are added. The resulting mixture is maintained at 90–95° C. for 1.5 hours, then cooled to room temperature to provide the desired product.

EXAMPLE 22

989.2 parts of the polyisobutenyl-substituted succinic anhydride used in Example 1 and 663.4 parts of 40N oil are heated to 90–95° C. with continuous stirring. 208.0 parts of diethylethanolamine are added over a 2-hour period with continuous stirring while maintaining the temperature at 90–95° C. The resulting mixture is heated for an additional 4.5 hours at 90–95° C. The mixture is cooled to 80° C. 133.4 parts of neutral zinc salt of O,O'-di(isooctyl) phosphorodithioic acid are added over 0.5 hour while maintaining the mixture at 80° C. 6.0 parts of water are added. The resulting mixture is maintained at 80° C. for 1.5 hours, then cooled to room temperature to provide the desired product.

EXAMPLE 23

989.2 parts of the polyisobutenyl-substituted succinic anhydride used in Example 1 are heated with continuous stirring to 90–95° C. 208.0 parts of diethylethanolamine are added over a 2-hour period with continuous stirring while maintaining the temperature at 90–95° C. The resulting mixture is heated for an additional 4.5 hours at 90–95° C. 663.4 parts of 40N oil are added over a 15-minute period while maintaining the temperature at 90–95° C. 133.4 parts of neutral zinc salt of O,O'-di(isooctyl) phosphorodithioic acid are added over 0.5 hour while maintaining the mixture at 90–95° C. 6.0 parts of water are added. The resulting mixture is maintained at 90–95° C. for 1.5 hours, then cooled to room temperature to provide the desired product.

EXAMPLE 24

989.2 parts of the polyisobutenyl-substituted succinic anhydride used in Example 1 are heated to 90–95° C. with continuous stirring. 208.0 parts of diethylethanolamine are added over a 2-hour period with continuous stirring while maintaining the temperature at 90–95° C. The resulting mixture is heated for an additional 4.5 hours at 90–95° C. 663.4 parts of 40N oil are added. The mixture is cooled to 80° C. 133.4 parts of neutral zinc salt of O,O'-di(isooctyl) phosphorodithioic acid are added over 0.5 hour while maintaining the mixture at 79–82° C. 6.0 parts of water are added. The resulting mixture is maintained at 79–82° C. for 1.5 hours, then cooled to room temperature to provide the desired product.

EXAMPLE 25

989.2 parts of the polyisobutenyl-substituted succinic anhydride used in Example 1 are heated to 90–95° C. with continuous stirring. 208.0 parts of diethylethanolamine are added over a 2-hour period with continuous stirring while maintaining the temperature at 90–95° C. The resulting mixture is heated for an additional 4.5 hours at 90–95° C. The mixture is cooled to 80° C. 133.4 parts of neutral zinc salt of O,O'-di(isooctyl) phosphorodithioic acid are added over 0.5 hour while maintaining the mixture at 80° C. 6.0 parts of water are added. The resulting mixture is maintained at 79–82° C. for 1.5 hours. 663.4 parts of 40N oil are added. The mixture is stirred for 30 minutes while cooling to 60° C. to provide the desired product.

EXAMPLE 26

989.2 parts of the polyisobutenyl-substituted succinic anhydride used in Example 1 and 663.4 parts of 40N oil are heated to 90–95° C. with continuous stirring. 208.0 parts of diethylethanolamine are added over a 2-hour period with continuous stirring while maintaining the temperature at 90–95° C. The resulting mixture is heated for an additional 4.5 hours at 90–95° C. The mixture is cooled to 81° C. 133.4 parts of neutral zinc salt of O,O'-di(isooctyl) phosphorodithioic acid are added over 0.5 hour. 6.0 parts of water are added. The resulting mixture is maintained at 79–82° C. for 1.5 hours with stirring, then cooled to room temperature to provide the desired product.

EXAMPLE 27

900 parts of the product from Example 1, are heated to 80–90° C. with continuous stirring. 100 parts of neutral zinc salt of O,O'-di(isooctyl) phosphorodithioic acid are added over a 20-minute period while maintaining the temperature at 80–90° C. The mixture is maintained at 80–90° C. for 2 hours then cooled to room temperature to provide the desired product.

EXAMPLE 28

1120 parts of the polyisobutenyl-substituted succinic anhydride used in Example 1 are heated to 101–107° C. with continuous stirring. 234 parts of diethylethanolamine are added over a 30–40 minute period with continuous stirring while maintaining the temperature at 104–110° C. The resulting mixture is heated for an additional 3 hours at 104° C. The mixture is cooled to 75–80° C. 150.5 parts of neutral zinc salt of O,O'-di(isooctyl) phosphorodithioic acid are added over a 15–20 minute period while maintaining the mixture at 75–80° C. The resulting mixture is maintained at 75–80° C. for 2 hours, then cooled to room temperature to provide the desired product.

EXAMPLE 29

450 parts of the product of Example 2 and 50 parts of neutral zinc salt of O,O'di(isooctyl) phosphorodithioic acid are heated at a temperature of 80° C. for 2 hours with stirring, then cooled to room temperature to provide the desired product.

EXAMPLE 30

360 parts of the product of Example 3 and 40 parts of neutral zinc salt of O,O'di(isooctyl) phosphorodithioic acid are heated at a temperature of 80° C. for 2 hours with stirring, then cooled to room temperature to provide the desired product.

EXAMPLE 31

450 parts of the product of Example 4 and 50 parts of neutral zinc salt of O,O'di(isooctyl) phosphorodithioic acid are heated at a temperature of 80° C. for 2 hours with stirring, then cooled to room temperature to provide the desired product.

EXAMPLE 32

90 parts of the reaction product of one mole of the polyisobutenyl-substituted succinic anhydride used in Example 1 with 1.5 moles of diethanolamine, and 10 parts of neutral zinc salt of O,O′di(isooctyl) phosphorodithioic acid are heated at a temperature of 80° C. for 2 hours then cooled to room temperature to provide the desired product.

EXAMPLE 33

900 parts of the product of Example 2 are heated to 80-90° C. with stirring. 100 parts of neutral zinc salt of O,O′-di(isooctyl) phosphorodithioic acid are added over a 20-minute period with stirring while maintaining the temperature at 80-90° C. The mixture is maintained at 80-90° C. for 1.25 hours with stirring, then cooled to room temperature to provide the desired product.

Explosive Compositions:

The explosive compositions of the invention are water-in-oil emulsions. In one embodiment, these compositions are useful as bulk blasting compositions or blasting agents. In another embodiment they are useful as cap-sensitive explosives. These emulsions employ the inventive emulsifier compositions as emulsifiers. These emulsions comprise a discontinuous oxidizer phase comprising at least one oxygen-supplying component, a continuous organic phase comprising at least one carbonaceous fuel, and an emulsifying amount of the inventive emulsifier.

The organic phase of the explosive compositions of the invention is preferably present at a level in the range of from about 2% to about 15% by weight, more preferably from about 4% to about 8% by weight based on the total weight of said explosive composition. The inventive emulsifier is preferably present at a level in the range of from about 4% to about 40% by weight, more preferably from about 12% to about 20% by weight based on the total weight of the organic phase.

The oxidizer phase is preferably present at a level in the range of from about 85% to about 98% by weight, more preferably from about 92% to about 96% by weight based on the total weight of said explosive composition. The oxygen-supplying component is preferably present at a level in the range of from about 70% to about 95% by weight, more preferably from about 85% to about 92% by weight, more preferably from about 87% to about 90% by weight based on the total weight of the oxidizer phase. The water is preferably present at a level in the range of about 5% to about 30% by weight, more preferably about 8% to about 15% by weight, more preferably about 10% to about 13% by weight based on the weight of the oxidizer phase.

The carbonaceous fuel can include most hydrocarbons, for example, paraffinic, olefinic, naphthenic, aromatic, saturated or unsaturated hydrocarbons, and is typically in the form of an oil. In general, the carbonaceous fuel is a water-immiscible, emulsifiable hydrocarbon that is either liquid or liquefiable at temperatures of up to about 95° C., and preferably between about 40° C. and about 75° C. Oils from a variety of sources, including natural and synthetic oils and mixtures thereof can be used as the carbonaceous fuel.

Natural oils include animal oils and vegetable oils (e.g., castor oil, lard oil) as well as solvent-refined or acid-refined mineral lubricating oils of the paraffinic, naphthenic, or mixed paraffin-naphthenic types. Oils derived from coal or shale are also useful. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another class of useful oils. These include tetraethyl-silicate, tetraisopropyl-silicate, tetra-(2-ethylhexyl)-silicate, tetra-(4-methylhexyl)-silicate, tetra(p-tert-butylphenyl)-silicate, hexyl-(4-methyl-2-pentoxy)-di-siloxane, poly(methyl)siloxanes, poly-(methylphenyl)-siloxanes, etc. Other useful synthetic oils include liquid esters of phosphorus-containing acid (e.g., tricresyl phosphate, trioctyl phosphate, diethyl ester of decane phosphonic acid, etc.), polymeric tetrahydrofurans, and the like.

Unrefined, refined and rerefined oils (and mixtures of each with each other) of the type disclosed hereinabove can be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA;

a mineral oil available from Pennzoil under the trade designation N-750-HT; 40N oil available from Sun; refined mineral oil available from Witco Chemical Company under the name KLEAROL OIL; and a mineral seal oil available from Exxon under the name MENTOR 28.

The carbonaceous fuel can be any wax having melting point of at least about 25° C., such as petrolatum wax, microcrystalline wax, and paraffin wax, mineral waxes such as ozocerite and montan wax, animal waxes such as spermacetic wax, and insect waxes such as beeswax and Chinese wax. Useful waxes include waxes identified by the trade designation MOBILWAX 57 which is available from Mobil Oil Corporation; D02764 which is a blended wax available from Astor Chemical Ltd.; and VYBAR which is available from Petrolite Corporation. Preferred waxes are blends of microcrystalline waxes and paraffin.

In one embodiment, the carbonaceous fuel includes a combination of a wax and an oil. In this embodiment, the wax content is at least about 25% and preferably ranges from about 25% to about 90% by weight of the organic phase, and the oil content is at least about 10% and preferably ranges from about 10% to about 75% by weight of the organic phase. These mixtures are particularly suitable for use in cap-sensitive explosive emulsions.

While its presence is not necessary, the explosive emulsions can also contain up to about 15% by weight of an auxiliary fuel, such as aluminum, aluminum alloys, magnesium, and the like. Particulate aluminum is a preferred auxiliary fuel.

The oxygen-supplying component is preferably at least one inorganic oxidizer salt such as ammonium, alkali or alkaline earth metal nitrate, chlorate or perchlorate. Examples include ammonium nitrate, sodium nitrate, calcium nitrate, ammonium chlorate, sodium perchlorate and ammonium perchlorate. Ammonium nitrate is especially preferred. Mixtures of ammonium nitrate and sodium or calcium nitrate are also preferred. In one embodiment, inorganic oxidizer salt comprises principally ammonium nitrate, although up to about 25% by weight of the oxidizer phase can comprise either another inorganic nitrate (e.g., alkali or alkaline earth metal nitrate) or an inorganic perchlorate (e.g., ammonium perchlorate or an alkali or alkaline earth metal perchlorate) or a mixture thereof.

In one embodiment of the invention, closed-cell, void-containing materials are used as sensitizing components. The term "closed-cell, void-containing material" is used herein to mean any particulate material which comprises closed cell, hollow cavities. Each particle of the material can contain one or more closed cells, and the cells can contain a gas, such as air, or can be evacuated or partially evacuated. In one embodiment of the invention, sufficient closed cell void containing material is used to yield a density in the resulting emulsion of from about 0.8 to about 1.35 g/cc, more preferably about 0.9 to about 1.3 g/cc, more preferably about 1.1 to about 1.3 g/cc. In general, the emulsions of the subject invention can contain up to about 15% by weight, preferably from about 0.25% to about 15% by weight of the closed cell void containing material. Preferred closed cell void containing materials are discrete glass spheres having a particle size within the range of about 10 to about 175 microns. In general, the bulk density of such particles can be within the range of about 0.1 to about 0.4 g/cc. Useful glass microbubbles which can be used are the microbubbles sold by 3M Company and which have a particle size distribution in the range of from about 10 to about 160 microns and a nominal size in the range of about 60 to 70 microns, and densities in the range of from about 0.1 to about 0.4 g/cc.; these include microbubbles distributed under the trade designation B15/250. Other useful glass microbubbles are sold under the trade designation of ECCOSPHERES by Emerson & Cumming, Inc., and generally have a particle size range from about 44 to about 175 microns and a bulk density of about 0.15 to about 0.4 g/cc. Other suitable microbubbles include the inorganic microspheres sold under the trade designation of Q-CEL by Philadelphia Quartz Company. The closed cell void containing material can be made of inert or reducing materials. For example, phenol-formaldehyde microbubbles can be utilized within the scope of this invention. If the phenol-formaldehyde microbubbles are utilized, the microbubbles themselves are a fuel component for the explosive and their fuel value should be taken into consideration when designing a water-in-oil emulsion explosive composition. Another closed cell void containing material which can be used within the scope of the subject invention is the saran microspheres sold by Dow Chemical Company. The saran microspheres have a diameter of about 30 microns and a particle density of about 0.032 g/cc. Because of the low bulk density of the saran microspheres, it is preferred that only from about 0.25 to about 1% by weight thereof be used in the water-in-oil emulsions of the subject invention.

Gas bubbles which are generated in-situ by adding to the composition and distributing therein a gas-generating material such as, for example, an aqueous solution of sodium nitrite and urea, can also be used can be used to sensitize the explosive emulsions. Other suitable sensitizing components which may be employed alone or in addition to the foregoing include insoluble particulate solid self-explosives such as, for example, grained or flaked TNT, DNT, RDX and the like and water-soluble and/or hydrocarbon-soluble organic sensitizers such as, for example, amine nitrates, alkanolamine nitrates, hydroxyalkyl nitrates, and the like. The explosive emulsions of the present invention may be formulated for a wide range of applications. Any combination of sensitizing components may be selected in order to provide an explosive composition of virtually any desired density, weight-strength or critical diameter. The quantity of solid self-explosive ingredients and of water-soluble and/or hydrocarbon-soluble organic sensitizers may comprise up to about 40% by weight of the total explosive composition. The volume of the occluded gas component may comprise up to about 50% of the volume of the total explosive composition.

Optional additional materials may be incorporated in the explosive compositions of the invention in order to further improve sensitivity, density, strength, rheology and cost of the final explosive. Typical of materials found useful as optional additives include, for example, highly chlorinated paraffinic hydrocarbons, particulate oxygen-supplying salts such as prilled ammonium nitrate, calcium nitrate, perchlorates, and the like, particulate metal fuels such as aluminum, silicon and the like, particulate non-metal fuels such as sulfur, gilsonite and the like, particulate inert materials such as sodium chloride, barium sulphate and the like, water phase or hydrocarbon phase thickeners such as guar gum, polyacrylamide, carboxymethyl or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art. The quantities of optional additional materials used may comprise up to about 50% by weight of the total explosive composition, the actual quantities employed depending upon their nature and function.

The general criteria for cap-sensitivity is that the explosive be sensitive to a No. 8 blasting cap at a cartridge diameter of 1.25 inch under normal temperature conditions. The cap-sensitive explosive emulsions of the present invention are shelf stable, which means they exhibit shelf stability of at least six months and typically one year or more.

A preferred method for making the explosive emulsions of the invention comprises the steps of (1) mixing water, inorganic oxidizer salts (e.g., ammonium nitrate) and, in certain cases, some of the supplemental water-soluble compounds, in a first premix, (2) mixing the carbonaceous fuel, the emulsifying salt compositions of the invention and any other optional oil-soluble compounds, in a second premix and (3) adding the first premix to the second premix in a suitable mixing apparatus, to form a water-in-oil emulsion. The first premix is heated until all the salts are completely dissolved and the solution may be filtered if needed in order to remove any insoluble residue. The second premix is also heated to liquefy the ingredients. Any type of apparatus capable of either low or high shear mixing can be used to prepare these water-in-oil emulsions. Closed-cell void containing materials, gas-generating materials, solid self-explosive ingredients such as particulate TNT, solid fuels such as aluminum or sulfur, inert materials such as barytes or sodium chloride, undissolved solid oxidizer salts and other optional materials, if employed, are added to the emulsion and simply blended until homogeneously dispersed throughout the composition.

The water-in-oil explosive emulsions of the invention can also be prepared by adding the second premix liquefied organic solution phase to the first premix hot aqueous solution phase with sufficient stirring to invert the phases. However, this method usually requires substantially more energy to obtain the desired dispersion than does the preferred reverse procedure. Alternatively, these water-in-oil explosive emulsions are particularly adaptable to preparation by a continuous mixing process where the two separately prepared liquid phases are pumped through a mixing device wherein they are combined and emulsified.

The emulsifier compositions of this invention can be added directly to the inventive explosive emulsions. They can also be diluted with a substantially inert, normally liquid organic diluent such as mineral oil, naphtha, benzene, toluene or xylene, to form a concentrate. In one embodiment, the diluent is also useful as the carbonaceous fuel for making the explosive emulsions. These concentrates usually contain from about 10% to about 90% by weight of the emulsifier composition of this invention and may contain, in addition, one or more other additives known in the art or described hereinabove.

Explosive cartridges within the scope of this invention can be made using techniques well known in the art. The cap-sensitive explosive emulsions of the invention are particularly suitable for making cartridges on cartridging machines such as the type available from Niepmann under the trade designation ROLLEX.

An advantage of using the inventive emulsifier compositions is that said compositions impart anti-wear characteristics to the emulsions thus facilitating processing and blending of said emulsions and reducing wear on the apparatus (e.g., mixers, pumps, etc.) used in preparing such emulsions.

Illustrative emulsions within the scope of the invention are disclosed in the following Table. With each formulation, the oxidizer phase components (i.e., ammonium nitrate and water) are mixed together at about 130° C. The oil phase components (i.e., emulsifier compositions from Examples 20–32 and 40N oil) are also mixed together at about 130° C. The oxidizer phase is added to the oil phase using a laboratory mixer to effect emulsification. The mixer is set at 70% of maximum power during emulsification and at full power for about one minute after emulsification is completed. In the following table, all numerical values are in parts by weight.

TABLE

| | A | B | C | D | E | F | G | H | I | J | K | L | M |
|---|---|---|---|---|---|---|---|---|---|---|---|---|---|
| Ammonium Nitrate | 763.6 | 763.6 | 763.6 | 763.6 | 763.6 | 763.6 | 763.6 | 763.6 | 763.6 | 763.6 | 763.6 | 763.6 | 763.6 |
| Water | 156.4 | 156.4 | 156.4 | 156.4 | 156.4 | 156.4 | 156.4 | 156.4 | 156.4 | 156.4 | 156.4 | 156.4 | 156.4 |
| 40 N Oil | 65.0 | 65.0 | 65.0 | 65.0 | 65.0 | 65.0 | 65.0 | 65.0 | 65.0 | 70.0 | 70.0 | 70.0 | 70.0 |
| Product of Ex. 20 | 15.0 | — | — | — | — | — | — | — | | | | | |
| Product of Ex. 21 | — | 15.0 | — | — | — | — | — | | | | | | |
| Product of Ex. 22 | — | — | 15.0 | — | — | — | — | | | | | | |
| Product of Ex. 23 | — | — | — | 15.0 | — | — | — | | | | | | |
| Product of Ex. 24 | — | — | — | — | 15.0 | — | — | | | | | | |
| Product of Ex. 25 | — | — | — | — | — | 15.0 | — | | | | | | |
| Product of Ex. 26 | — | — | — | — | — | — | 15.0 | | | | | | |
| Product of Ex. 27 | | | | | | | | 15.0 | — | — | — | — | — |
| Product of Ex. 28 | | | | | | | | — | 15.0 | — | — | — | — |
| Product of Ex. 29 | | | | | | | | — | — | 10.0 | — | — | — |
| Product of Ex. 30 | | | | | | | | — | — | — | 10.0 | — | — |
| Product of Ex. 31 | | | | | | | | — | — | — | — | 10.0 | — |
| Product of Ex. 32 | | | | | | | | — | — | — | — | — | 10.0 |

Glass microballoons can be added to each of the above indicated emulsions by blending said microballoons into said emulsions with the laboratory mixer. For example, water-in-oil emulsion explosive compositions containing 98.5–99.0% by weight of said emulsions and 1.0–1.5% by weight of C15/250 glass microballoons can be made. Emulsion explosive compositions can be made that contain 97% by weight of the above emulsions and 3% by weight of B37/2000 glass microballoons.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An explosive emulsion comprising a discontinuous oxidizer phase comprising at least one oxygen-supplying component, a continuous organic phase comprising at least one carbonaceous fuel, and an emulsifying amount of a composition comprising the reaction product of component (I) with component (II);

component (I) comprising:
(A) the reaction product of
(A)(i) at least one hydrocarbyl-substituted carboxylic acid or anhydride or ester or amide derived from said acid or anhydride, with
(A)(ii) ammonia, at least one amine, at least one alkali metal and/or at least one alkaline-earth metal; or
(B) a composition comprising
(B)(i) the reaction product of (B)(i)(a) at least one high-molecular weight hydrocarbyl-substituted carboxylic acid or anhydride, or ester or amide derived from said high-molecular weight acid or anhydride, with (B)(i)(b) ammonia, at least one amine, at least one alkali metal and/or at least one alkaline-earth metal, component (B)(i)(a) having at least one hydrocarbyl substituent having an average of about 20 to about 500 carbon atoms; and
(B)(ii) the reaction product of (B)(ii)(a) at least one low-molecular weight carboxylic acid or anhydride, or ester or amide derived from said low-molecular weight acid or anhydride, with (B)(ii)(b) ammonia, at least one amine, at least one alkali metal and/or at least one alkaline-earth metal, component (B)(ii)(a) optionally having at least one hydrocarbyl substituent having an average of up to about 18 carbon atoms; or
(C) a composition comprising
(C)(i) the reaction product of (C)(i)(a) at least one high-molecular weight hydrocarbyl-substituted polycarboxylic acid or anhydride, or ester or amide derived from said high-molecular weight polycarboxylic acid or anhydride, with (C)(i)(b) ammonia, at least one amine, at least one alkali metal and/or at least one alkaline-earth metal, component (C)(i)(a) having at least one hydrocarbyl substituent having an average of about 20 to about 500 carbon atoms; and
(C)(ii) the reaction product of (C)(ii)(a) at least one low-molecular weight polycarboxylic acid or anhydride, or ester or amide derived from said low-molecular weight polycarboxylic acid or anhydride, with (C)(ii)(b) ammonia, at least one amine, at least one alkali metal and/or at least one alkaline-earth metal, component (C)(ii)(a) optionally having at least one hydrocarbyl substituent having an average of up to about 18 carbon atoms;
said components (C)(i) and (C)(ii) being coupled together by (C)(iii) at least one compound having
(C)(iii)(a) two or more primary amino groups,
(C)(iii)(b) two or more secondary amino groups,
(C)(iii)(c) at least one primary amino group and at least one secondary amino group, (C)(iii)(d) at least two hydroxyl groups, or (C)(iii)(e) at least one primary or secondary amino group and at least one hydroxyl group; or
(D) mixture of two or more of (A), (B) and (C);

component (II) comprising:
(A') at least one phosphorus-containing acid represented by the formula

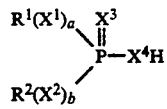

wherein $X^1$, $X^2$, $X^3$ and $X^4$ are independently oxygen or sulfur; a and b are independently zero or one, and $R^1$ and $R^2$ are independently hydrocarbyl groups; or
(B') at least one salt derived from said phosphorus-containing acid (A') and at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof; or
(C') mixture of (A') and (B');
with the proviso that when component (II) is (A'), component (I) is (B), (C) or a mixture of (B) and (C).

2. The composition of claim 1 wherein (A)(i) is a monocarboxylic acid or anhydride, or ester or amide derivative of said monocarboxylic acid or anhydride.

3. The composition of claim 1 wherein (A)(i) is a polycarboxylic acid or anhydride, or ester or amide derivative of said polycarboxylic acid or anhydride.

4. The composition of claim 1 wherein (A)(i) is represented by the formulae

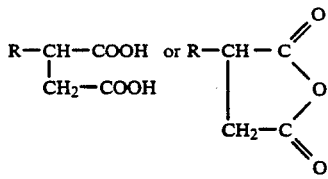

wherein R is said hydrocarbyl substituent of (A)(i).

5. The composition of claim 1 wherein component (A)(i) is an ester or amide derived from at least one compound represented by the formulae

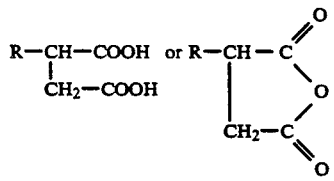

wherein R is said hydrocarbyl substituent of (A)(i).

6. The composition of claim 1 wherein (A)(i) is a hydrocarbyl-substituted carboxylic acid or anhydride, or ester or amide derivative of said acid or anhydride, said hydrocarbyl substituent of (A)(i) having an average of from about 10 to about 500 carbon atoms.

7. The composition of claim 1 wherein (A)(i) is a hydrocarbyl-substituted carboxylic acid or anhydride, or ester or amide derivative of said acid or anhydride, said hydrocarbyl substituent of (A)(i) having an average of from about 30 to about 500 carbon atoms.

8. The composition of claim 1 wherein (A)(i) is a hydrocarbyl-substituted carboxylic acid or anhydride, or ester or amide derivative of said acid or anhydride, said hydrocarbyl substituent of (A)(i) having an average of from about 50 to about 500,carbon atoms.

9. The composition of claim 1 wherein (A)(i) is a hydrocarbyl-substituted carboxylic acid or anhydride, or ester or amide derivative of said acid or anhydride, said hydrocarbyl substituent of (A)(i) is an aliphatic hydrocarbyl group.

10. The composition of claim 1 wherein (A)(i) is a hydrocarbyl-substituted carboxylic acid or anhydride, or ester or amide derivative of said acid or anhydride, said hydrocarbyl substituent of (A)(i) is a poly(isobutenyl) group.

11. The composition of claim 1 wherein component (A)(i) is derived from at least one alkylene polyamine of the formula

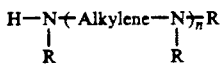

wherein n is a number in the range of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

12. The composition of claim 1 wherein component (A)(i) is derived from at least one compound represented by the formula

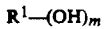

wherein $R^1$ is a monovalent or polyvalent organic group joined to the OH groups through carbon-to-oxygen bonds and m is a number of from 1 to about 10.

13. The composition of claim 1 wherein component (A)(i) is derived from at least one hydroxyamine.

14. The composition of claim 1 wherein component (A)(i) is derived from at least one compound selected from the group consisting of (a') primary, secondary and tertiary alkanol amines which can be represented correspondingly by the formulae

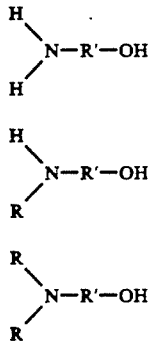

(b') hydroxyl-substituted oxyalkylene analogs of said alkanol amines represented by the formulae

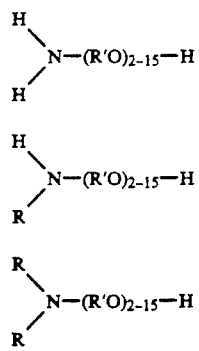

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

15. The composition of claim 1 wherein component (A)(ii) comprises at least one monoamine.

16. The composition of claim 1 wherein component (A)(ii) comprises at least one polyamine.

17. The composition of claim 1 wherein component (A)(ii) comprises at least one alkylene polyamine of the formula

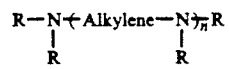

wherein n is a number of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

18. The composition of claim 1 wherein component (A)(ii) comprises at least one hydroxyamine.

19. The composition of claim 1 wherein component (A)(ii) comprises (a') at least one N-(hydroxyl-substituted hydrocarbyl) amine, (b') at least one hydroxyl-substituted poly(hydrocarbyloxy) analog of (a'), or (c') a mixture of (a') and (b').

20. The composition of claim 1 wherein component (A)(ii) is selected from the group consisting of (a') primary, secondary and tertiary alkanol amines which can be represented correspondingly by the formulae

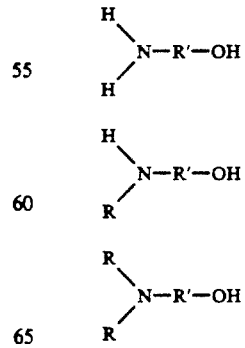

(b') hydroxyl-substituted oxyalkylene analogs of said alkanol amines represented by the formulae

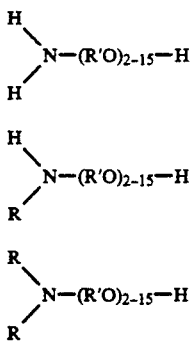

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

21. The composition of claim 1 wherein component (A)(ii) comprises diethylethanolamine.

22. The composition of claim 1 wherein (B)(i)(a) is a monocarboxylic acid or anhydride, or ester or amide derivative of said monocarboxylic acid or anhydride.

23. The composition of claim 1 wherein (B)(i)(a) is a polycarboxylic acid or anhydride, or ester or amide derivative of said polycarboxylic acid or anhydride.

24. The composition of claim 1 wherein (B)(i)(a) is represented by the formulae

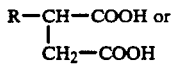

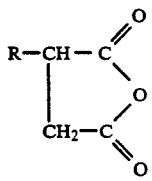

wherein R is said hydrocarbyl substituent of (B)(i)(a).

25. The composition of claim 1 wherein said hydrocarbyl substituent of (B)(i)(a) has an average of from about 30 to about 500 carbon atoms.

26. The composition of claim 1 wherein said hydrocarbyl substituent of (B)(i)(a) has an average of from about 50 to about 500 carbon atoms.

27. The composition of claim 1 wherein said hydrocarbyl substituent of (B)(i)(a) is an aliphatic hydrocarbyl group.

28. The composition of claim 1 wherein said hydrocarbyl substituent of (B)(i)(a) is a poly(isobutylenyl) group.

29. The composition of claim 1 wherein component (B)(i)(a) is derived from at least one alkylene polyamine of the formula

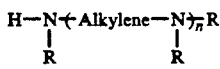

wherein n is a number in the range of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

30. The composition of claim 1 wherein component (B)(i)(a) is derived from at least one compound represented by the formula

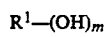

wherein $R^1$ is a monovalent or polyvalent organic group joined to the OH groups through carbon-to-oxygen bonds and m is a number of from 1 to about 10.

31. The composition of claim 1 wherein component (B)(i)(a) is derived from at least one hydroxyamine.

32. The composition of claim 1 wherein component (B)(i)(a) is derived from at least one compound selected from the group consisting of (a') primary, secondary and tertiary alkanol amines which can be represented correspondingly by the formulae

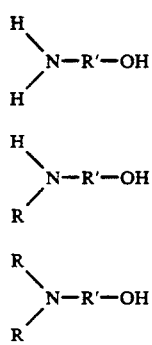

(b') hydroxyl-substituted oxyalkylene analogs of said alkanol amines represented by the formulae

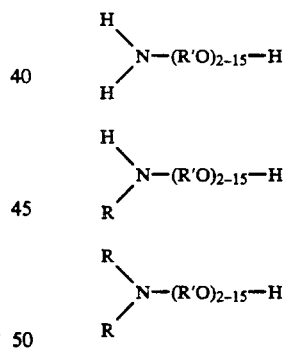

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

33. The composition of claim 1 wherein component (B)(i)(b) comprises at least one monoamine.

34. The composition of claim 1 wherein component (B)(i)(b) comprises at least one polyamine.

35. The composition of claim 1 wherein component (B)(i)(b) comprises at least one alkylene polyamine of the formula

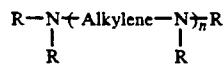

wherein n is a number of from 1 to about 10, each R is independently a hydrogen atom or a hydrocarbyl or hydroxy-substituted hydrocarbyl group having up to about carbon atoms, and the Alkylene group has from 1 to about 10 carbon atoms.

36. The composition of claim 1 wherein component (B)(i)(b) comprises at least one hydroxyamine.

37. The composition of claim 1 wherein component (B)(i)(b) comprises (a') at least one N-(hydroxyl-substituted hydrocarbyl) amine, (b') at least one hydroxyl-substituted poly(hydrocarbyloxy) analog of (a'), or (c') a mixture of (a') and (b').

38. The composition of claim 1 wherein component (B)(i)(b) is selected from the group consisting of (a') primary, secondary and tertiary alkanol amines which can be represented correspondingly by the formulae

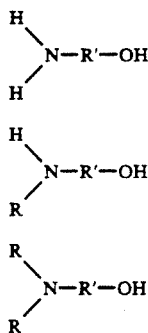

(b') hydroxyl-substituted oxyalkylene analogs of said alkanol amines represented by the formulae

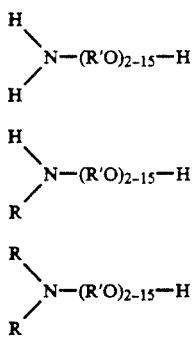

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more of any of the above.

39. The composition of claim 1 wherein component (B)(ii)(a) comprises at least one compound selected from the group consisting of maleic acid, maleic anhydride, chloromaleic anhydride, malonic acid, succinic acid, succinic anhydride, glutaric acid, glutaric anhydride, adipic acid, pimelic acid, azelaic acid, sebacic acid, glutaconic acid, citraconic acid, itaconic acid, allyl succinic acid, cetyl malonic acid and tetrapropylene-substituted succinic anhydride.

40. The composition of claim 1 wherein component (B)(ii)(a) comprises at least one compound selected from the group consisting of formic acid, acetic acid, chloroacetic acid, propionic acid, butyric acid, acrylic, benzoic acid, butanoic acid, cyclohexanoic, dodecanoic acid, palmitic acid, decanoic acid, oleic acid, lauric acid, stearic acid, myristic acid, linoleic acid, linolenic acid, naphthenic acid, chlorostearic acid and tall oil acid.

41. The composition of claim 1 wherein (B)(ii)(a) is represented by the formulae

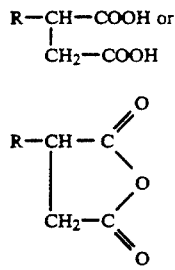

wherein R is said hydrocarbyl substituent of (B)(ii)(a).

42. The composition of claim 1 wherein said hydrocarbyl substituent of (B)(ii)(a) is derived from at least one compound selected from the group consisting of ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene and 1-octadecene.

43. The composition of claim 1 wherein said hydrocarbyl substituent of (B)(ii)(a) is derived from at least one alpha-olefin fraction selected from the group consisting of $C_{15-18}$ alpha-olefins, $C_{12-16}$ alpha-olefins, $C_{14-16}$ alpha-olefins, $C_{14-18}$ alpha-olefins and $C_{16-18}$ alpha-olefins.

44. The composition of claim 1 wherein said hydrocarbyl substituent of (B)(ii)(a) has an average of from about 8 to about 18 carbon atoms.

45. The composition of claim 1 wherein said hydrocarbyl substituent of (B)(ii)(a) has an average of from about 12 to about 18 carbon atoms.

46. The composition of claim 1 wherein said hydrocarbyl substituent of (B)(ii)(a) is an alkyl or an alkenyl group.

47. The composition of claim 1 wherein component (B)(ii)(a) is derived from at least one alkylene polyamine of the formula

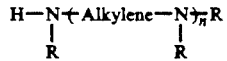

wherein n is a number in the range of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

48. The composition of claim 1 wherein component (B)(ii)(a) is derived from at least one compound represented by the formula

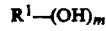

wherein $R^1$ is a monovalent or polyvalent organic group joined to the OH groups through carbon-to-oxygen bonds and m is a number of from 1 to about 10.

49. The composition of claim 1 wherein component (B)(ii)(a) is derived from at least one hydroxyamine.

50. The composition of claim 1 wherein component (B)(ii)(a) is derived from at least one compound selected from the group consisting of (a') primary, secondary and tertiary alkanol amines which can be represented correspondingly by the formulae

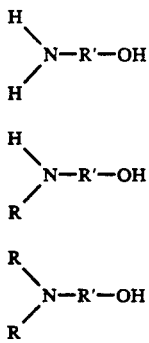

(b') hydroxyl-substituted oxyalkylene analogs of said alkanol amines represented by the formulae

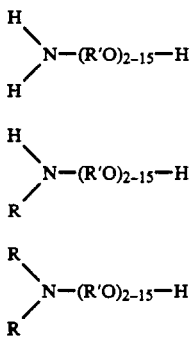

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

51. The composition of claim 1 wherein component (B)(ii)(b) comprises at least one monoamine.

52. The composition of claim 1 wherein component (B)(ii)(b) comprises at least one polyamine.

53. The composition of claim 1 wherein component (B)(ii)(b) comprises at least one alkylene polyamine of the formula

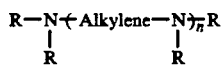

wherein n is a number of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

54. The composition of claim 1 wherein component (B)(ii)(b) comprises (a') at least one N-(hydroxyl-substituted hydrocarbyl) amine, (b') at least one hydroxyl-substituted poly(hydrocarbyloxy) analog of (a'), or (c') a mixture of (a') and (b').

55. The composition of claim 1 wherein component (B)(ii)(b) is selected from the group consisting of (a') primary, secondary and tertiary alkanol amines which can be represented correspondingly by the formulae

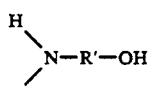
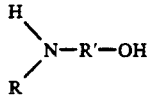
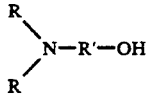

(b') hydroxyl-substituted oxyalkylene analogs of said alkanol amines represented by the formulae

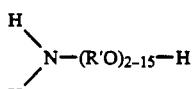
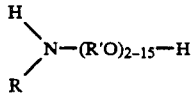
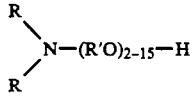

wherein each R is independently a hydrocarbyl group of 1 to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

56. The composition of claim 1 wherein (C)(i)(a) is represented by the formulae

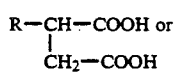

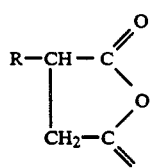

wherein R is said hydrocarbyl substituent of (C)(i)(a).

57. The composition of claim 1 wherein said hydrocarbyl substituent of (C)(i)(a) has an average of from about 30 to about 500 carbon atoms.

58. The composition of claim 1 wherein said hydrocarbyl substituent of (C)(i)(a) has an average of from about 50 to about 500 carbon atoms.

59. The composition of claim 1 wherein said hydrocarbyl substituent of (C)(i)(a) is a poly(isobutenyl) group.

60. The composition of claim 1 wherein said hydrocarbyl substituent of (C)(i)(a) is an aliphatic hydrocarbyl group.

61. The composition of claim 1 wherein component (C)(i)(a) is derived from at least one alkylene polyamine of the formula

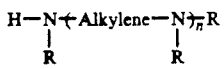

wherein n is a number in the range of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

62. The composition of claim 1 wherein component (C)(i)(a) is derived from at least one compound represented by the formula

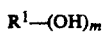

wherein $R^1$ is a monovalent or polyvalent organic group joined to the OH groups through carbon-to-oxygen bonds and m is a number of from 1 to about 10.

63. The composition of claim 1 wherein component (C)(i)(a) is derived from at least one hydroxyamine.

64. The composition of claim 1 wherein component (C)(i)(a) is derived from (a') at least one N-(hydroxyl-substituted hydrocarbyl) amine, (b') at least one hydroxyl-substituted poly(hydrocarbyloxy) analog of (a'), or (c') a mixture of (a') and (b').

65. The composition of claim 1 wherein component (C)(i)(a) is derived from at least one compound selected from the group consisting of (a') primary, secondary and tertiary alkanol amines which can be represented correspondingly by the formulae

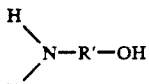

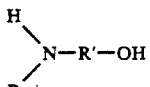

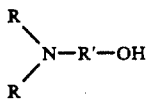

(b') hydroxyl-substituted oxyalkylene analogs of said alkanol amines represented by the formulae

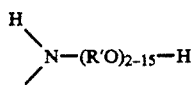

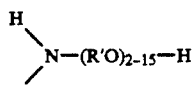

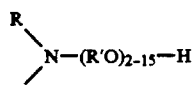

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

66. The composition of claim 1 wherein component (C)(i)(b) comprises at least one monoamine.

67. The composition of claim 1 wherein component (C)(i)(b) comprises at least one polyamine.

68. The composition of claim 1 wherein component (C)(i)(b) comprises at least one alkylene polyamine of the formula

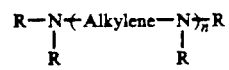

wherein n is a number of from 1 to about 10, each R is independently a hydrogen atom or a hydrocarbyl or hydroxy-substituted hydrocarbyl group having up to about carbon atoms, and the Alkylene group has from 1 to about 10 carbon atoms.

69. The composition of claim 1 wherein component (C)(i)(b) comprises (a') at least one N-(hydroxyl-substituted hydrocarbyl) amine, (b') at least one hydroxyl-substituted poly(hydrocarbyloxy) analog of (a'), or (c') a mixture of (a') and (b').

70. The composition of claim 1 wherein component (C)(i)(b) is selected from the group consisting of (a') primary, secondary and tertiary alkanol amines which can be represented correspondingly by the formulae

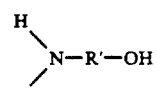

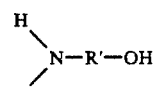

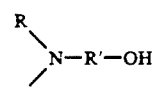

(b') hydroxyl-substituted oxyalkylene analogs of said alkanol amines represented by the formulae

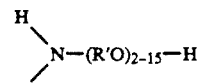

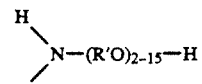

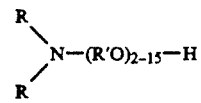

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more of any of the above.

71. The composition of claim 1 wherein component (C)(ii)(a) comprises at least one compound selected from the group consisting of maleic acid, maleic anhydride, chloromaleic anhydride, malonic acid, succinic acid, succinic anhydride, glutaric acid, glutaric anhydride, adipic acid, pimelic acid, azelaic acid, sebacic acid, glutaconic acid, citraconic acid, itaconic acid, allyl succinic acid, cetyl malonic acid and tetrapropylene-substituted succinic anhydride.

72. The composition of claim 1 wherein (C)(ii)(a) is represented by the formulae

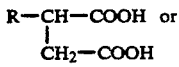

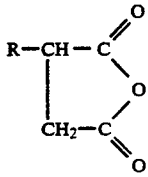

wherein R is said hydrocarbyl substituent of (C)(ii)(a).

73. The composition of claim 1 wherein said hydrocarbyl substituent of (C)(ii)(a) is derived from at least one compound selected from the group consisting of ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene and 1-octadecene.

74. The composition of claim 1 wherein said hydrocarbyl substituent of (C)(ii)(a) is derived from at least one alpha-olefin fraction selected from the group consisting of $C_{15-18}$ alpha-olefins, $C_{12-16}$ alpha-olefins, $C_{14-16}$ alpha-olefins, $C_{14-18}$ alpha-olefins and $C_{16-18}$ alpha-olefins.

75. The composition of claim 1 wherein said hydrocarbyl substituent of (C)(ii)(a) has an average of from about 8 to about 18 carbon atoms.

76. The composition of claim 1 wherein said hydrocarbyl substituent of (C)(ii)(a) has an average of from about 12 to about 18 carbon atoms.

77. The composition of claim 1 wherein said hydrocarbyl substituent of (C)(ii)(a) is an alkyl or an alkenyl group.

78. The composition of claim 1 wherein component (C)(ii)(a) is derived from at least one alkylene polyamine of the formula

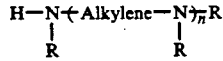

wherein n is a number in the range of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

79. The composition of claim 1 wherein component (C)(ii)(a) is derived from at least one compound represented by the formula

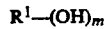

wherein $R^1$ is a monovalent or polyvalent organic group joined to the OH groups through carbon-to-oxygen bonds and m is a number of from 1 to about 10.

80. The composition of claim 1 wherein component (C)(ii)(a) is derived from at least one hydroxyamine.

81. The composition of claim 1 wherein component (C)(ii)(a) is derived from at least one compound selected from the group consisting of (a') primary, secondary and tertiary alkanol amines which can be represented correspondingly by the formulae

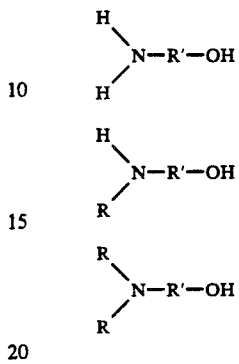

(b') hydroxyl-substituted oxyalkylene analogs of said alkanol amines represented by the formulae

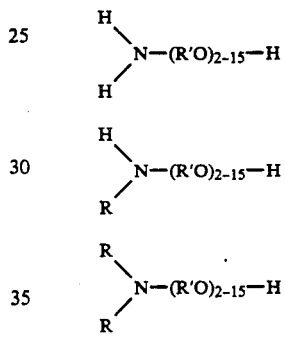

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

82. The composition of claim 1 wherein component (C)(ii)(b) comprises at least one monoamine.

83. The composition of claim 1 wherein component (C)(ii)(b) comprises at least one polyamine.

84. The composition of claim 1 wherein component (C)(ii)(b) comprises at least one alkylene polyamine of the formula

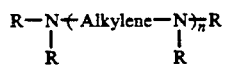

wherein n is a number of from 1 to about 10, each R is independently a hydrogen atom or a hydrocarbyl or hydroxy-substituted hydrocarbyl group having up to about 700 carbon atoms, and the Alkylene group has from 1 to about 10 carbon atoms.

85. The composition of claim 1 wherein component (C)(ii)(b) comprises (a') at least one N-(hydroxyl-substituted hydrocarbyl) amine, (b') at least one hydroxyl-substituted poly(hydrocarbyloxy) analog of (a'), or (c') a mixture of (a') and (b').

86. The composition of claim 1 wherein component (C)(ii)(b) is selected from the group consisting of (a') primary, secondary and tertiary alkanol amines which can be represented correspondingly by the formulae

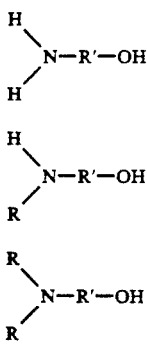

(b') hydroxyl-substituted oxyalkylene analogs of said alkanol amines represented by the formulae

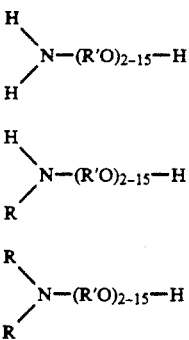

wherein each R is independently a hydrocarbyl group of 1 to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

87. The composition of claim 1 wherein component (C)(iii) comprises at least one polyamine.

88. The composition of claim 1 wherein component (C)(iii) comprises at least one alkylene polyamine of the formula

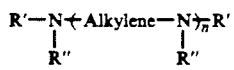

wherein n is a number in the range of from 1 to about 10, each R' and R" is independently hydrogen or a hydrocarbyl or hydroxy-substituted hydrocarbyl group having up to about 700 carbon atoms, with the proviso that at least one of R' and at least one of R" are hydrogen, and the Alkylene group has from 1 to about 10 carbon atoms.

89. The composition of claim 1 wherein component (C)(iii) comprises at least one polyol.

90. The composition of claim 1 wherein component (C)(iii) comprises at least one compound represented by the formula

wherein R is a monovalent or polyvalent organic group joined to the OH groups through carbon-to-oxygen bonds and m is a number of from 2 to about 10.

91. The composition of claim 1 wherein component (C)(iii) comprises at least one alkylene glycol.

92. The composition of claim 1 wherein component (C)(iii) comprises ethylene glycol.

93. The composition of claim 1 wherein component (C)(iii) is selected from the group consisting of (a') primary and secondary alkanol amines which can be represented correspondingly by the formulae

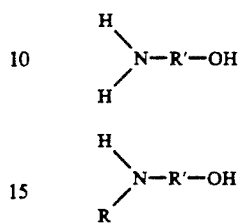

(b') hydroxyl-substituted oxyalkylene analogs of said alkanol amines represented by the formulae

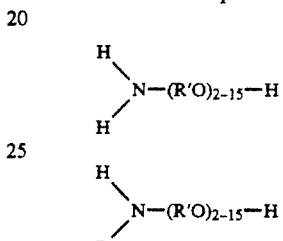

wherein R is a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c') mixtures of two of more thereof.

94. The composition of claim 1 wherein in component (II), $X^1$ and $X^2$ are oxygen.

95. The composition of claim 1 wherein in component (II), $X^3$ and $X^4$ are sulfur.

96. The composition of claim 1 wherein in component (II), $R^1$ and $R^2$ are independently hydrocarbyl groups of from 1 to about 50 carbon atoms.

97. The composition of claim 1 wherein in component (II), $R^1$ and $R^2$ are independently t-butyl, isobutyl, amyl, isooctyl, decyl, dodecyl, eicosyl, 2-pentenyl, dodecenyl, phenyl, naphthyl, alkylphenyl, alkylnaphthyl, phenylalkyl, naphthylalkyl, alkylphenylalkyl or alkylnaphthylalkyl groups.

98. The composition of claim 1 wherein said component (II)(B') comprises at least one salt derived from said phosphorous-containing acid (II)(A') and calcium, zinc, cadmium, copper, nickel, or a mixture of two or more thereof.

99. The composition of claim 1 wherein said component (II)(B') comprises at least one salt derived from said phosphorous-containing acid (II)(A') and zinc.

100. An explosive emulsion comprising a discontinuous oxidizer phase comprising at least one oxygen-supplying component, a continuous organic phase comprising at least one-carbonaceous fuel, and an emulsifying amount of a composition comprising at least one complex derived from component (I) and component (II); component (I) comprising:

(A) the reaction product of
  (A)(i) at least one carboxylic acid or anhydride, or ester or amide derived from said acid or anhydride, with (A)(ii) ammonia, at least one amine, at least one alkali metal and/or at least one alkaline-earth metal; or (B) a composition comprising (B)(i) the reaction product of (B)(i)(a) at least one high-molecular weight hydrocarbyl-substituted carboxylic acid or anhydride, or ester or amide derived from said high-molecular weight acid or anhydride, with (B)(i)(b) ammonia, at least one amine, at least one alkali metal and/or at least one alkaline-earth metal, component (B)(i)(a) having at least one hydrocarbyl substituent having an average of about 20 to about 500 carbon atoms; and (B)(ii) the reaction product of (B)(ii)(a) at least one low-molecular weight carboxylic acid or anhydride, or ester or amide derived from said low-molecular weight acid or anhydride, with (B)(ii)(b) ammonia, at least one amine, at least one alkali metal and/or at least one alkaline-earth metal, component (B)(ii)(a) optionally having at least one hydrocarbyl substituent having an average of up to about 18 carbon atoms; or (C) a composition comprising (C)(i) the reaction product of (C)(i)(a) at least one high-molecular weight hydrocarbyl-substituted polycarboxylic acid or anhydride, or ester or amide derived from said high-molecular weight polycarboxylic acid or anhydride, with (C)(i)(b) ammonia, at least one amine, at least one alkali metal and/or at least one alkaline-earth metal, component (C)(i)(a) having at least one hydrocarbyl substituent having an average of about 20 to about 500 carbon atoms; and (C)(ii) the reaction product of (C)(ii)(a) at least one low-molecular weight polycarboxylic acid or anhydride, or ester or amide derived from said low-molecular weight polycarboxylic acid or anhydride, with (C)(ii)(b) ammonia, at least one amine, at least one alkali metal and/or at least one alkaline-earth metal, component (C)(ii)(a) optionally having at least one hydrocarbyl substituent having an average of up to about 18 carbon atoms;

said components (C)(i) and (C)(ii) being coupled together by (C)(iii) at least one compound having (C)(iii)(a) two or more primary amino groups, (C)(iii)(b) two or more secondary amino groups, (C)(iii)(c) at least one primary amino group and at least one secondary amino group, (C)(iii)(d) at least two hydroxyl groups, or (C)(iii)(e) at least one primary or secondary amino group and at least one hydroxyl group; or (D) mixture of two or more of (A), (B) and (C);

component (II) comprising at least one salt derived from:

(A') at least one phosphorus-containing acid represented by the formula

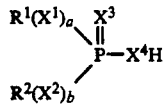

wherein $X^1$, $X^2$, $X^3$ and $X^4$ are independently oxygen or sulfur; a and b are independently zero or one, and $R^1$ and $R^2$ are independently hydrocarbyl groups; and (B') at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof.

101. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) the reaction product of at least one carboxylic acid or anhydride, or amide or ester derived from said acid or anhydride, with ammonia, at least one amine, at least one alkali metal and/or at least one alkaline-earth metal; and (II) at least one salt derived from at least one phosphorus-containing acid represented by the formula

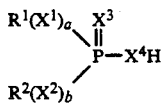

wherein $X^1$, $X^2$, $X^3$ and $X^4$ are independently oxygen or sulfur, a and b are independently zero or one, and $R^1$ and $R^2$ are independently hydrocarbyl groups; and at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof.

102. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) the reaction product of polyisobutenyl-substituted succinic acid or anhydride with diethylethanolamine; and (II) at least one zinc salt of at least one phosphorus-containing acid represented by the formula

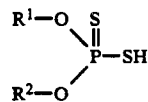

wherein $R^1$ and $R^2$ are independently hydrocarbyl groups of about 4 to about 12 carbon atoms.

103. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) a composition comprising the reaction product of at least one high-molecular weight hydrocarbyl-substituted carboxylic acid or anhydride, or amide or ester derived from said acid or anhydride, with ammonia, at least one amine, at least one alkali and/or at least one alkaline-earth metal, said high-molecular weight acid or anhydride or derivative having at least one hydrocarbyl substituent having an average of from about 20 to about 500 carbon atoms; and the reaction product of at least one low-molecular weight carboxylic acid or anhydride, or amide or ester derived from said acid or anhydride, with ammonia, at least one amine, at least one alkali and/or alkaline-earth metal, said low-molecular weight acid or anhydride or derivative optionally having at least one hydrocarbyl substituent having an average of up to about 18 carbon atoms; and (II) at least one salt derived from at least one phosphorus-containing acid represented by the formula

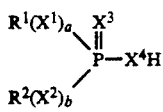

wherein $X^1$, $X^2$, $X^3$ and $X^4$ are independently oxygen or sulfur; a and b are independently zero or one, and $R^1$ and $R^2$ are independently hydrocarbyl groups; and at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof.

104. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) a composition comprising:
the reaction product of polyisobutenyl-substituted succinic acid or anhydride with dimethylethanolamine or diethylethanolamine, said polyisobutenyl substituent of said acid or anhydride having from about 50 to about 500 carbon atoms; and the reaction product of at least one alkyl- or alkenyl-substituted carboxylic acid or anhydride with dimethylethanolamine or diethylethanolamine, said alkyl or alkenyl substituent of said acid or anhydride having from about 8 to about 18 carbon atoms; and (II) at least one zinc salt of at least one phosphorus-containing acid represented by the formula

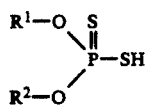

wherein $R^1$ and $R^2$ are independently hydrocarbyl groups of about 4 to about 12 carbon atoms.

105. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) at least one composition comprising:

at least one first reaction product derived from at least one high-molecular weight polycarboxylic acid or anhydride, or ester or amide derived from said acid or anhydride, and ammonia, at least one amine, at least one alkali metal and/or at least one alkaline-earth metal, said high-molecular weight acid or anhydride or derivative having at least one hydrocarbyl substituent having an average of from about 20 to about 500 carbon atoms; and at least one second reaction product derived from at least one low-molecular weight polycarboxylic acid or anhydride, or ester or amide derived from said acid or anhydride, and ammonia, at least one amine, at least one alkali metal and/or at least one alkaline-earth metal, said low-molecular weight acid or anhydride or derivative optionally having at least one hydrocarbyl substituent having an average of up to about 18 carbon atoms;

said first and second reaction products being coupled together by at least one compound having two or more primary amino groups, two or more secondary amino groups, at least one primary amino group and at least one secondary amino group, at least two hydroxyl groups or at least one primary or secondary amino group and at least one hydroxyl group; and (II) at least one salt derived from at least one phosphorus-containing acid represented by the formula

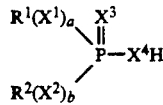

wherein $X^1$, $X^2$, $X^3$ and $X^4$ are independently oxygen or sulfur; a and b are independently zero or one, and $R^1$ and $R^2$ are independently hydrocarbyl groups; and at least one metal selected from the group consisting of magnesium, calcium, strontium, chromium, manganese, iron, molybdenum, cobalt, nickel, copper, silver, zinc, cadmium, aluminum, tin, lead, and mixtures of two or more thereof.

106. An explosive emulsion comprising a discontinuous oxidizer phase comprising at least one oxygen-supplying component, a continuous organic phase comprising at least one carbonaceous fuel, and an emulsifying amount of a composition comprising at least one complex derived from:

(I) a composition comprising:
a first reaction product of polyisobutenyl-substituted succinic acid or anhydride with dimethylethanolamine or diethylethanolamine, said polyisobutenyl substituent of said acid or anhydride having from about 50 to about 500 carbon atoms; and a second reaction product of at least one alkyl- or alkenyl-substituted carboxylic acid or anhydride with dimethylethanolamine or diethylethanolamine, said alkyl or alkenyl substituent of said acid or anhydride having from about 8 to about 18 carbon atoms;

said first reaction product and said second reaction product being coupled together by ethylene glycol; and
(II) at least one zinc salt of at least one phosphorus-containing acid represented by the formula
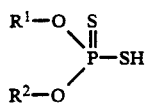
wherein $R^1$ and $R^2$ are independently hydrocarbyl groups of about 4 to about 12 carbon atoms.
* * * * *